(12) United States Patent
Shishido et al.

(10) Patent No.: US 7,044,640 B2
(45) Date of Patent: May 16, 2006

(54) BEARING UNIT, AND MOTOR USING SAME

(75) Inventors: Yuji Shishido, Kanagawa (JP); Kenichiro Yazawa, Tokyo (JP); Shinichiro Kato, Tokyo (JP); Shuichi Kikuchi, Miyagi (JP); Toru Ujiie, Miyagi (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 11/185,832

(22) Filed: Jul. 21, 2005

(65) Prior Publication Data

US 2005/0254736 A1    Nov. 17, 2005

Related U.S. Application Data

(63) Continuation of application No. 10/416,838, filed as application No. PCT/JP02/09360 on Sep. 12, 2002.

(30) Foreign Application Priority Data

| Sep. 21, 2001 | (JP) | ............................. P2001-289568 |
| Dec. 19, 2001 | (JP) | ............................. P2001-386479 |
| Dec. 19, 2001 | (JP) | ............................. P2001-386480 |
| Feb. 12, 2002 | (JP) | ............................. P2002-034332 |
| Feb. 12, 2002 | (JP) | ............................. P2002-034333 |

(51) Int. Cl.
*F16C 32/06* (2006.01)

(52) U.S. Cl. ........................................................ 384/10
(58) Field of Classification Search ................ 384/100, 384/107, 114, 121
See application file for complete search history.

(56) References Cited

U.S. PATENT DOCUMENTS

| 6,242,830 B1 | 6/2001 | Katagiri |
| 6,340,854 B1 | 1/2002 | Jeong |
| 6,398,414 B1 | 6/2002 | Chen |
| 6,513,979 B1 | 2/2003 | Mori et al. |
| 2003/0113045 A1 | 6/2003 | Funinaka |

FOREIGN PATENT DOCUMENTS

| JP | 63-125517 A1 | 8/1988 |
| JP | 2-113006 A1 | 9/1990 |
| JP | 7-229514 A1 | 8/1995 |

(Continued)

OTHER PUBLICATIONS

International Search Report Nov. 12, 2002.

*Primary Examiner*—Thomas R. Hannon
(74) *Attorney, Agent, or Firm*—Rader, Fishman & Grauer PLLC; Ronald P. Kananen

(57) ABSTRACT

A bearing unit is provided which includes a shaft (51) to support rotatably, radial bearing (55) to support the shaft (51) circumferentially, a thrust bearing (66) to support the shaft (51) in the direction of thrusting, and a housing (56) having the radial bearing (55) and thrust bearing (66) disposed therein and in which a viscous fluid (57) is filled. The housing (56) has a sealed structure except for a shaft insertion hole (65) formed therein and through which the shaft 51 is introduced. Between the outer surface of the shaft (51) and the inner surface of the shaft insertion hole (65), there is defined a gap (69) having a sufficient width to prevent the viscous fluid (57) filled in the housing (56) from leaking out of the latter. The housing (56) is formed as a one-piece structure by molding a synthetic resin.

4 Claims, 27 Drawing Sheets

FOREIGN PATENT DOCUMENTS

| | | |
|---|---|---|
| JP | 10-159854 A1 | 6/1998 |
| JP | 10-259820 A1 | 9/1998 |
| JP | 11-42514 A1 | 2/1999 |
| JP | 2000-4556 A1 | 1/2000 |
| JP | 2000-60063 A1 | 2/2000 |
| JP | 2000-310225 A1 | 11/2000 |
| JP | 2001-41243 A1 | 2/2001 |
| JP | 2001-50251 A1 | 2/2001 |
| JP | 2001-65577 A1 | 3/2001 |
| JP | 2001-82458 A1 | 3/2001 |
| JP | 2001-173656 A1 | 6/2001 |
| WO | WO 00/65591 A1 | 11/2000 |

BEARING UNIT, AND MOTOR USING SAME

This is a continuation of application Ser. No. 10/416,838, filed on May 15, 2003, which is a 371 application of PCT/JP02/09360 filed on Sep. 12, 2002, the entire contents being incorporated by reference.

TECHNICAL FIELD

The present invention relates to a bearing unit for supporting a rotating shaft rotatably or for supporting a rotating body rotatably on a shaft and a motor using the bearing unit.

BACKGROUND ART

There are already known various types of bearing units for supporting a rotating shaft to be rotatable, including a typical one constructed as shown in FIG. 1.

In FIG. 1, the bearing unit is generally indicated with a reference 1020. As shown, the bearing unit 1020 is to support a rotating shaft 1023 to be rotatable. It includes a metallic housing 1022 shaped as a cylinder open at opposite ends thereof and a radial bearing 1021 that supports the rotating shaft 1023 rotatably in the housing 1022. The housing 1022 has installed in one of the open ends thereof a thrust bearing 1024 that supports, thereon in the direction of thrusting, the rotating shaft 1023 supported rotatably in the radial bearing 1021.

The bearing unit 1020 uses a dynamic-pressure fluid bearing as the radial bearing 1021. The dynamic-pressure fluid bearing has formed in the inner circumference thereof opposite to the rotating shaft 1023 in the radial bearing 1021 dynamic pressure producing recesses intended to produce a dynamic pressure.

The housing 1022 is filled with a lubricant that is a viscous fluid and that is circulated through the dynamic pressure producing recesses when the rotating shaft 1023 rotates to produce a dynamic pressure.

The rotating shaft 1023 is inserted in the radial bearing 1021 and received rotatably in the housing 1022, with one end thereof being supported on the thrust bearing 1024.

The housing 1022 has fixed in the other open end thereof a metallic oil seal 1025 formed to have a toroidal shape, and which prevents the lubricant filled in the housing 1022 from leaking out from inside the latter. The rotating shaft 1023 is projected out of the housing 1022 through a shaft insertion hole 1026 formed in the center of the oil seal 1025 and through which the rotating shaft 1023 has been introduced.

To prevent the lubricant filled in the housing 1022 from leaking to outside, an adhesive is used between the oil seal 1025 and housing 1022 to provide a complete sealing at a junction 1027 there. The oil seal 1025 has applied to the inner surface thereof a surfactant to prevent the lubricant from being moved out of the housing 1022 through the shaft insertion hole 1026 under a centrifugal force developed by the rotation of the rotating shaft 1023.

In the bearing unit 1020 constructed as shown in FIG. 1, the lubricant filled in the housing 1022 will flow through only a gap 1031 defined between the outer surface of the rotating shaft 1023 and the inner surface of the shaft insertion hole 1026 (inner surface of the toroidal oil seal 1025). It should be noted that with the gap 1031 reduced in width, the lubricant will have the surface tension thereof increased correspondingly and thus can prevent itself from leaking out of the housing 1022.

Further, the rotating shaft 1023 is tapered (indicated at a reference 1030) at the outer surface thereof opposite to the inner surface of the shaft insertion hole 1026. Namely, the rotating shaft 1023 is tapered outwardly of the housing 1022. The taper surface 1031 will yield a pressure gradient in the gap 1031 defined between the taper surface 1030 itself and the inner surface of the shaft insertion hole 1026, so that a centrifugal force developed when the rotating shaft 1023 rotates will cause a force with which the lubricant filled in the housing 1022 is moved inwardly of the latter. Since the lubricant is thus moved inwardly of the housing 1022 when the rotating shaft 1023 rotates, it will positively enter the dynamic pressure producing recesses in the radial bearing 1021 formed from a dynamic-pressure fluid bearing to produce a dynamic pressure that will assure a stable supporting of the rotating shaft 1023 and prevent the lubricant filled in the housing 1022 from leaking out.

As above, the aforementioned bearing unit 1020 is constructed of the housing 1022, the thrust bearing 1024 and the oil seal 1025, each being an independent member. The number of parts of this bearing unit 1020 cannot be said to be small. In addition, the sealant, such as an adhesive, has to be used to form the oil-tight junction 1027 between the housing 1022 and oil seal 1025, which will cause the assembling of the bearing unit 1020 to be complicated.

Further, use of an adhesive as a sealant will hardly attain any complete sealing at the junction 1027 between the housing 1022 and the oil seal 1025 and permit no positive prevention of the lubricant filled in the housing 1022 from leaking out. To prevent the lubricant from leaking, a surfactant has to be applied to the surface of the oil seal 1025, which also will make the production of a bearing unit of this type more complicated.

As mentioned above, the conventional bearing unit includes many parts and thus is difficult to assemble. No positive sealing of the lubricant is possible. Therefore, conventional bearing units are expensive.

Also, a motor using a bearing unit of the above-mentioned type will be an assembly of many parts, thus difficult to assemble, and so it is not producible with less costs.

DISCLOSURE OF THE INVENTION

Accordingly, the present invention has an object to overcome the above-mentioned drawbacks of the related art by providing a novel bearing unit and a motor using the bearing unit.

The present invention has another object to provide a bearing unit with a smaller number of parts, easier to assemble and more reliable and a motor using the bearing unit.

The present invention has still another object to provide a bearing unit in which a viscous fluid, such as a lubricant or the like, filled in a housing can be prevented from leaking out and a motor using the bearing unit.

The present invention has yet another object to provide a bearing unit in which a viscous fluid filled in a housing can be prevented from being caused to leak out by an environmental change, such as a barometric-pressure change.

The present invention has still yet another object to provide a bearing unit installable easily and positively in a predetermined position, such as a stator of a motor or the like.

The present invention also has another object to provide a bearing unit in which static electricity developed at a rotating portion, such as a shaft or the like, can be discharged surely to outside to protect positively an electronic device using the bearing unit and a motor using the bearing unit.

The above object can be attained by providing a bearing unit including, according to the present invention, a shaft, a radial bearing to support the shaft circumferentially, a thrust bearing to support the shaft at one of the thrusting-directional ends thereof, and a housing in which the radial and thrust bearings supporting the shaft are disposed and a viscous fluid is filled, the housing having a hermetic structure except for a shaft insertion hole receiving the shaft therein and in which there is a gap, defined between the outer surface of the shaft and the inner surface of the shaft insertion hole, having a sufficient width to prevent the viscous fluid filled in the housing from leaking to outside.

Note that the housing is formed as a one-piece structure by molding a synthetic resin.

Either the inner surface of shaft insertion hole or shaft outer surface opposite to the inner surface of the shaft insertion hole is tapered to increase the gap defined between the shaft outer surface and the inner surface of the shaft insertion hole toward outside the housing.

The viscous fluid filled in the housing is filled up to at least a position where it is exposed in the gap defined between the shaft outer surface and the inner surface of the shaft insertion hole.

When the shaft or housing is rotated, the taper surface formed on the shaft outer surface or the inner surface of the shaft insertion hole will produce a force that causes the lubricant having entered the gap defined between the shaft outer surface and the inner surface of the shaft insertion hole to move inwardly of the housing.

The radial bearing is made of a sintered metal and will have impregnated therein the viscous fluid filled in the housing.

The radial bearing is a dynamic-pressure fluid bearing and has formed in the inner surface thereof opposite to the shaft outer surface dynamic pressure producing recesses that produce a dynamic pressure by the viscous fluid.

The thrust bearing supporting the shaft at one end of the latter is formed integrally inside the housing.

The end portion of the housing where the thrust bearing is disposed may be formed from a synthetic resin and joined by welding to the housing body also formed from the synthetic resin and in which the radial bearing is disposed.

The thrust bearing is formed integrally at the end portion of the housing that is welded to the housing body. The thrust bearing may be formed from a metal and integrally at the end portion of the housing that is welded to the housing body.

The end portion of the housing where the thrust bearing is disposed may be formed by out-sert molding integrally on the housing body in which the radial bearing is disposed.

There may be provided inside the housing a come-off preventive portion to prevent the shaft from coming off in the direction of thrusting through the shaft insertion hole.

The thrust bearing used in the bearing unit according to the present invention supports a projecting portion formed at one end of the shaft and larger in diameter that the shaft body, and has formed in the surface thereof opposite to the projecting portion of the shaft dynamic pressure producing recesses to produce a dynamic pressure by the viscous fluid.

The housing of the bearing unit according to the present invention has a projection provided for mechanically fixing the housing to a mating object.

The fixing means may be an engagement portion formed on the housing itself, a projection or screw.

The above fixing means assures an accurate positioning of the bearing unit in relation to a mating object for installation of the bearing unit to the latter.

The housing may have provided thereon a metallic member for installation of the housing to a mating object by bonding.

The housing may have provided thereon a detent to limit the rotation of the housing and mechanically fix the housing to a mating object.

Since the shaft, viscous fluid, radial bearing and housing in the bearing unit according to the present invention form together a discharge path leading to outside of the housing, static electricity developed due to the rotation of the shaft or of the housing in relation to the shaft can be discharged to outside the housing.

Further, the bearing unit according to the present invention may have formed in the housing a communication path that provides a communication of the inside of the housing where the thrust bearing supports the shaft at one end of the latter with outside of the housing. Because of such a communication path, air caused to stay inside the housing by an environmental change, such as a change in barometric pressure, temperature, etc., can be let to escape to outside the housing, so that it is possible to prevent the viscous fluid from leaking out of the housing.

Also, according to the present invention, the above object can be attained by providing a motor including a bearing unit supporting a rotor of the motor rotatably in relation to a stator of the motor, the bearing unit being one described above.

In the above motor, the rotor is fixed to the shaft of the bearing unit and thus rotated together with the shaft.

Also, the rotor may be constituted to be supported by the housing and rotate together along with the housing.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

Embodiments of the bearing unit according to the present invention and those of the motor using the bearing unit will be explained with reference to the accompanying drawings.

Prior to proceeding to the explanation of the bearing unit according to the present invention and motor using the bearing unit, there will be described an electronic apparatus in which a motor using the bearing unit according to the present invention is used as a drive unit. The electronic apparatus is a portable computer as an information processing apparatus to process various kinds of information.

Figure 1:
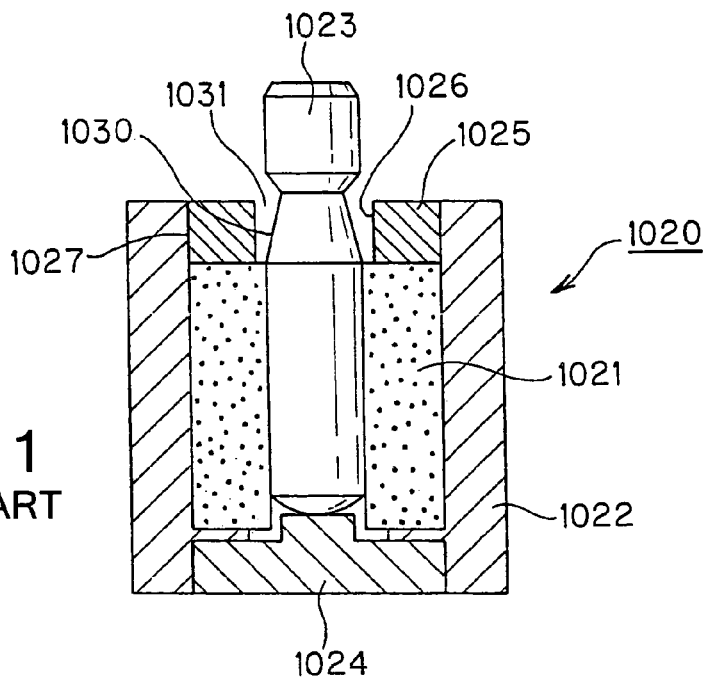
FIG. 1 is a sectional view of a conventional bearing unit.
Figure 2:
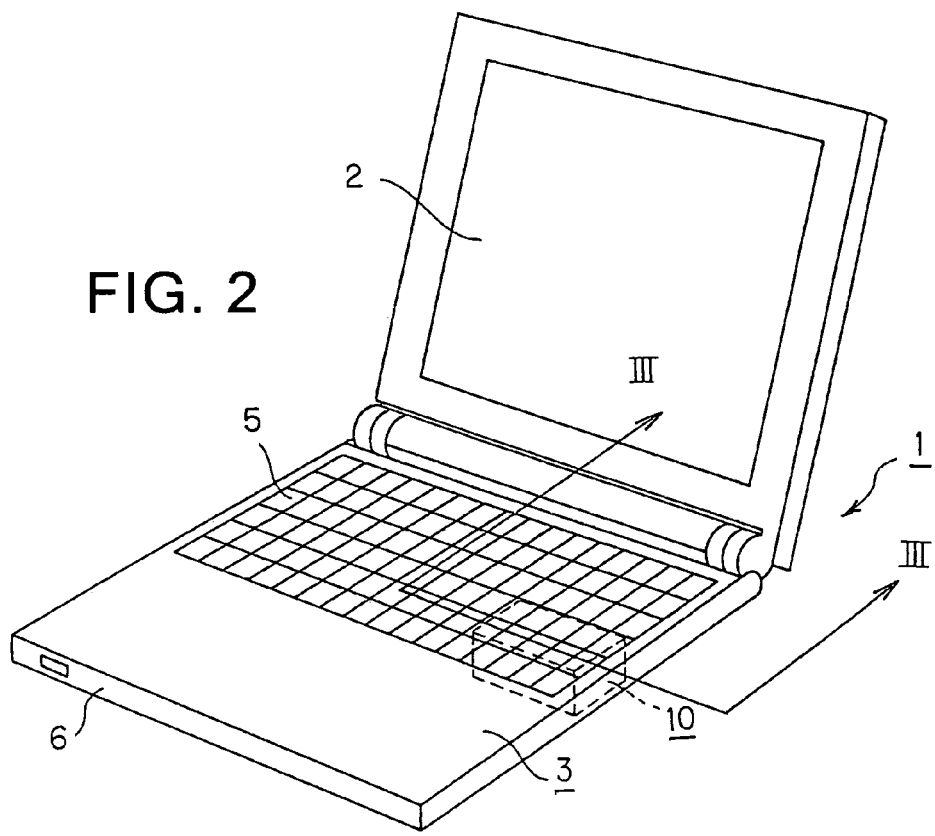
FIG. 2 is a perspective view of an example electronic apparatus including a motor using the bearing unit according to the present invention.

The above portable computer is generally indicated with a reference 1. As shown in FIG. 2, the computer 1 includes a display unit 2 to display a result of information processing and the like, and a main unit 3 incorporating an information processing to process various kinds of information. The main unit 3 of the computer 1 has provided thereon a keyboard 5 for use in entering various commands for the computer 1 or various kinds of information. A radiator 10 is provided inside the keyboard 5, as shown. The radiator 10 functions to radiate, to outside the computer main unit 3, heat dissipated from an information processing circuit, such as a CPU, disc drive unit, etc., disposed in the computer main unit 3, and also as a cooling apparatus to cool the inside of the computer main unit 3.

Figure 3:
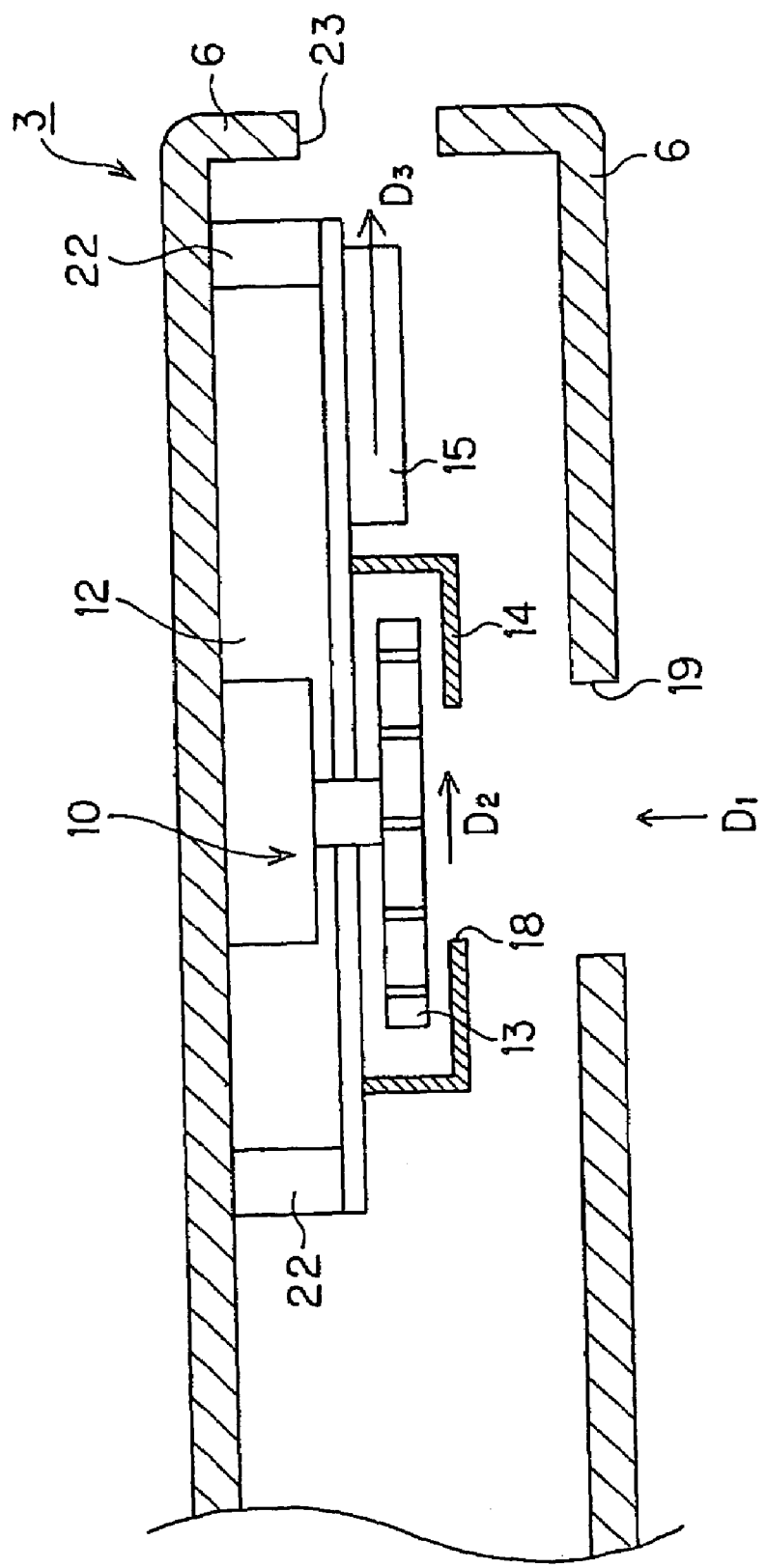
FIG. 3 is a sectional view, taken along a line III—III, of the electronic apparatus shown in FIG. 2.

The radiator 10 incorporated in the computer main unit 3 is housed in a casing 6 that forms the computer main unit as shown in FIG. 3. The radiator 10 includes a metallic base 11, a motor 12 installed on the base 11, a fan 13 driven by the motor 12, a fan case 14 housing the fan 13, and a heat sink 15, as shown in FIG. 4.

Figure 4:
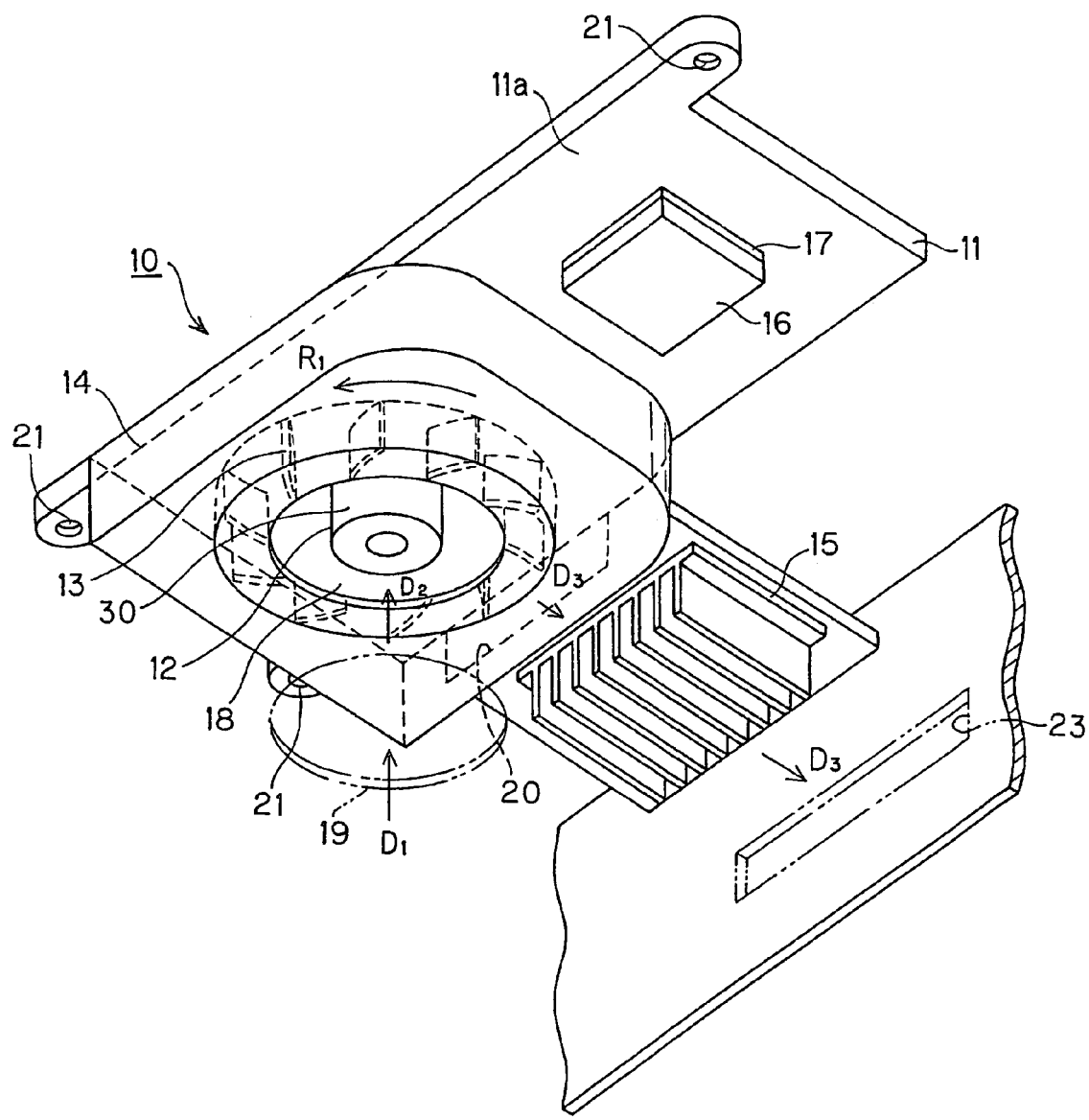
FIG. 4 is a perspective view of a radiator using the motor according to the present invention.

The base 11 is formed generally like the letter "L", as shown in FIG. 4. The L-shaped base 11 has installed on one side 11a at one end thereof a heat-dissipation element 16 that is energized and driven to dissipate heat, such as a CPU (central processing unit). The heat-dissipation element 16 is installed to the one side 11a of the base 11 on contact with a heat transfer seal 17.

On the base 11, there are installed nearly in the center of the one side 11a a motor 12 and the fan case 14 housing the fan 13 that is driven by the motor 12. The fan case 14 has formed therein a circular inlet 18 open in a position corresponding to the center of the fan 13 driven by the motor 12. Also, an opening 19 communicating with the inlet 18 is formed in the bottom of the casing 6 in a position opposite to the inlet 18 in the fan case 14. Further, the fan case 14 has formed therein an opening 20 to exhaust air sucked through the inlet 18 to outside.

The heat sink 15 is fixed to the one side 11a at the other end of the base 11. The heat sink 15 is a corrugated or fin-shaped one made of a metal excellent in the performance of heat radiation, such as aluminum. The base 11 and fan case 14 also should be desirably formed from aluminum or iron as a metal superb in the performance of heat radiation.

The base 11 has installed thereto the heat-dissipation element 16 and also the radiator 10 and heat sink 15, which radiate the heat dissipated from the heat-dissipation element 16 as above. It has formed therein a plurality of screw holes 21 through which there are inserted screws used to fix the base 11 to the inner surface of the casing 6. The base 11 is fixed to the inner surface of the casing 6 by driving fixing screws inserted in the screw holes 21 into bosses 22 formed inside the casing 6, as shown in FIG. 3.

When the base 11 is installed to the inner surface of the casing 6, the heat sink 15 is positioned opposite to an opening 23 formed in the lateral side of the casing 6, as shown in FIGS. 3 and 4.

When the motor 12 is put into operation and the fan 13 is driven by the motor 12 to rotate in the direction of arrow R1 in FIG. 4, the radiator 10 constructed as described above sucks air from outside the radiator through the opening 19 formed in the casing 6 in the direction of arrow D1 in FIGS. 3 and 4, while sucking air into the fan case 14 through the inlet 18. As the fan 13 is rotated, the air thus sucked in the fan case 14 is circulated in the direction of arrow $D_2$ in FIGS. 3 and 4, then in the direction of arrow $D_3$ in FIG. 4 through the heat sink 15, and exhausted to outside the casing 6 through the opening 23.

Note that the heat dissipated from the heat-dissipation element 16 installed to the base 11 and that is driven is transferred to the heat sink 15 installed to the base 11 via the base 11 formed from the metal excellent in heat-dissipation performance. At this time, the air sucked from outside the casing 6 by the rotating fan 13 of the radiator 10 will flow through between a plurality of fins of the heat sink 15 to radiate the heat transferred to the heat sink 15 to outside the casing 6 through the opening 23.

Next, the motor 12 that drives to rotate the fan 13 of the aforementioned radiator 10 and a bearing unit 30 according to the present invention used with the motor 12 will be described in detail.

Figure 5:
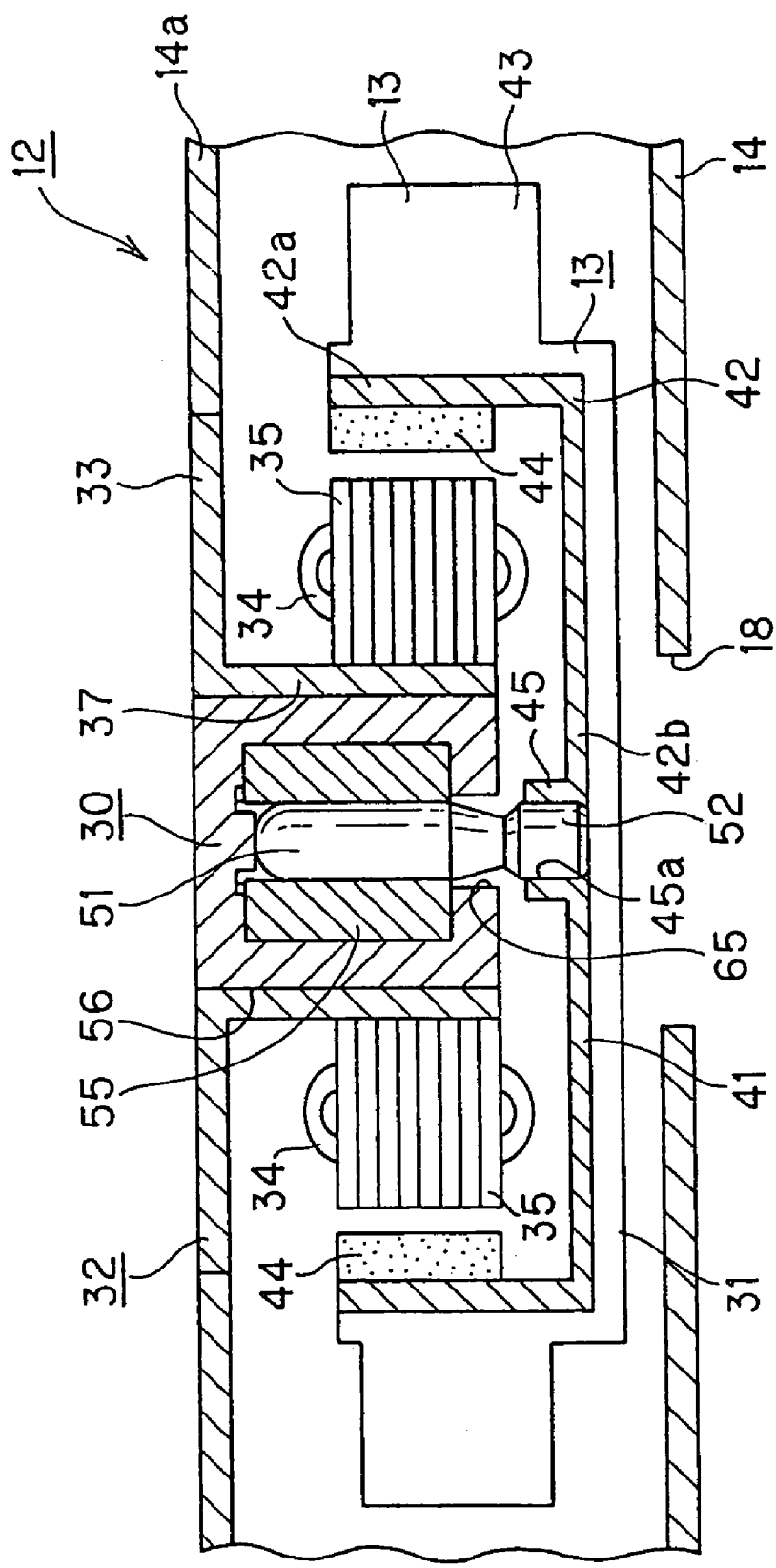
FIG. 5 is a sectional view of the radiator provided with the motor using the bearing unit according to the present invention.

The motor 12 using the bearing unit 30 includes a rotor 31 and stator 32, as shown in FIG. 5.

The stator 32 is provided integrally with an upper plate 14a of the fan case 14 housing the motor 12 along with the fan 13 driven to rotate by the motor 12. The stator 32 includes a stator yoke 33, a bearing unit 30 according to the present invention, a coil 34 and a core 35 having the coil 34 wound thereon. The stator yoke 33 may be formed either integrally with the upper plate 14a or the fan case 14, that is, it may be formed from a part of the fan case 14 or may be formed separately from the upper plate 14a. The stator yoke 33 is formed from iron, for example. The bearing unit 30 is fixed to a holder 37 formed as a cylinder in the center of the stator yoke 33 by press-fitting or bonding or by both.

Note that the holder 37 in which the bearing unit 30 is press-fitted is formed as a cylinder integrally with the stator yoke 33.

The holder 37 formed integrally with the stator yoke 33 has installed on the outer surface thereof the core 35, having wound thereon the coil 34 that is supplied with an exciting current, as shown in FIG. 5.

The rotor 31 included together with the stator 32 in the motor 12 is fixed to a rotating shaft 51 supported rotatably by the bearing unit 30, and thus rotates along with the rotating shaft 51. The rotor 31 includes a rotor yoke 42 and the fan 13 with a plurality of blades 43 rotating along with the rotor yoke 42. The blades 43 of the fan 13 are formed integrally with the rotor yoke 42 by out-sert molding on the outer surface of the rotor yoke 42.

The rotor yoke 42 has a cylindrical portion 42a, and a ring-shaped rotor magnet 44 is provided on the inner surface of the cylindrical portion 42a to be opposite to the coil 34 of the stator 32. The rotor magnet 44 is a plastic magnet that is alternately magnetized as N and S poles circumferentially. The rotor magnet 44 is fixed to the inner surface of the rotor yoke 42 with an adhesive.

The rotor yoke 42 includes a plate portion 42b having a boss 45 formed in the center thereof, and a through-hole 45a is formed through the boss 45. The rotating shaft 51 supported in the bearing unit 30 has a fixing portion 52 provided at the end thereof. With the fixing portion 52 of the rotating shaft 51 being press-fitted into the through-hole 45a in the rotor yoke 42, the rotor yoke 42 is fixed to the rotating shaft 51 to be rotatable with the latter.

In the motor 12 constructed as above, when the coil 34 of the stator 32 is supplied with an exciting current from a drive circuit provided outside the motor 12 according to a predetermined pattern of excitation, the rotor 31 is rotated along with the rotating shaft 51 under the action of the magnetic field developed around the coil 34 and that from the rotor magnet 44 at the rotor 31. As the rotor 31 is thus rotated, the fan 13 fixed to the rotor 31 and including the plurality of blades 43 also is rotated along with the rotor 31. As the fan 13 is thus rotated, air is sucked from outside the apparatus in the direction of arrow D1 in FIGS. 3 and 4 through the opening 19 in the casing 6 and circulated in the direction of arrow $D_2$, and thus it flows through the heat sink 15 and goes out of the casing 6 through the opening 23. The air will thus radiate the heat dissipated from the heat-dissipation element 16 to outside the computer main unit 3, namely, to cool the inside of the computer main unit 3.

Figure 6:
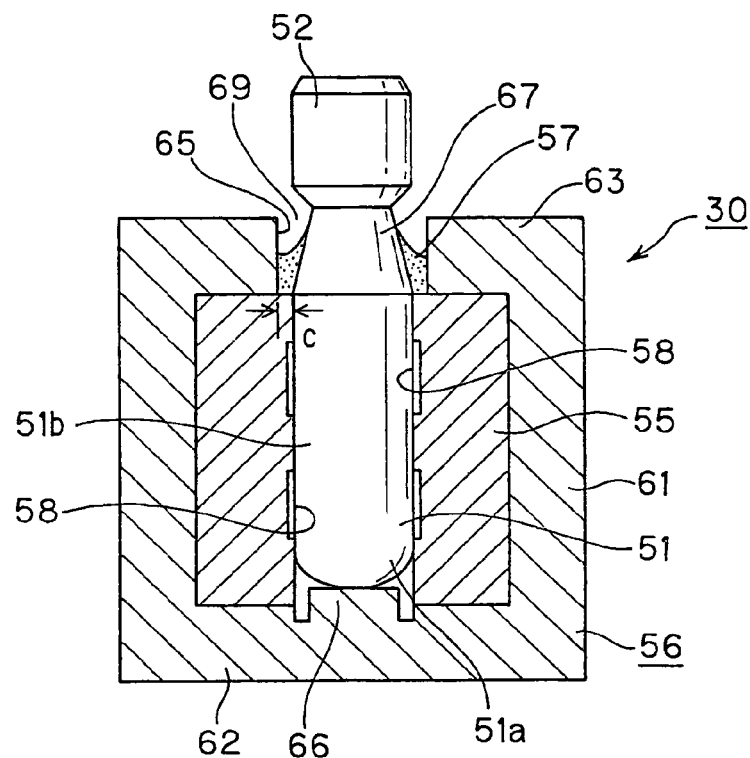
FIG. 6 is a sectional view of a first embodiment of the bearing unit according to the present invention.

As shown in FIGS. 5 and 6, the bearing unit 30 supporting the rotating shaft 51 of the aforementioned motor 12 includes a radial bearing 55 which supports the rotating shaft 51 circumferentially and a housing 56 which receives the radial bearing 55.

Figure 7:
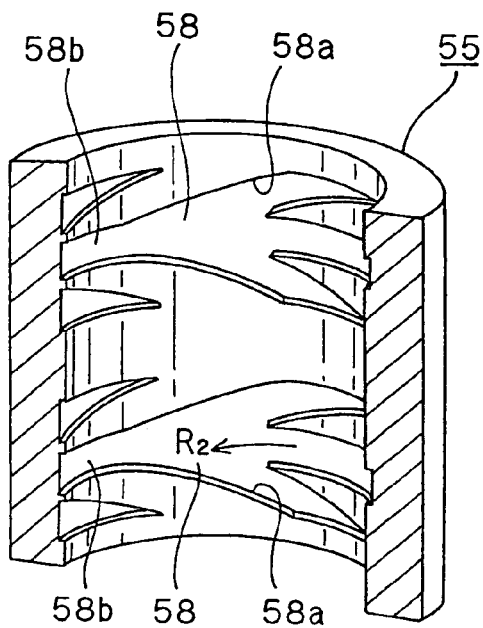
FIG. 7 is a perspective view of a radial bearing in the bearing unit in FIG. 6 showing dynamic pressure producing recesses formed in the inner surface of the radial bearing.

The radial bearing 55 is formed from a sintered metal to have a cylindrical shape. The radial bearing 55 and a lubricant 57, being a viscous fluid and filled in the housing 56, form together a dynamic-pressure fluid bearing. The radial bearing 55 has dynamic pressure producing recesses 58 formed in the cylindrical inner surface thereof that is in contact with the inserted rotating shaft 51. As shown in FIG. 7, each of the dynamic pressure producing recesses 58 formed in the inner surface of the radial bearing 55 includes pairs of recesses 58a, each pair forming a "V" shape, and a coupling recess 58b each coupling two successive V-shaped pairs of recesses 58a with each other circumferentially of the inner surface of the radial bearing 55. In the dynamic pressure producing recesses 58, the V-shape of each pair of recesses 58a is directed at the bottom end thereof in the direction of rotation R2 of the rotating shaft 51. In this embodiment, the dynamic pressure producing recesses 58 are provided in one pair, upper and lower, in parallel with each other perpendicularly to the axis of the cylindrical radial bearing 55. The number and size of the dynamic pressure producing recesses 58 thus formed in the radial bearing 55 are appropriately selected depending upon the diameter and length of the radial bearing 55.

When the rotating shaft 51 inserted in the radial bearing 55 formed as a dynamic-pressure fluid bearing continuously rotates about a center axis C1 in the direction of arrow R2 in FIG. 7, the lubricant 57 filled in the housing 56 circulates through the dynamic pressure producing recesses 58 and produces a dynamic pressure between the outer surface of the rotating shaft 51 and inner surface of the radial bearing 55 to support the rotating shaft 51 being rotated. The dynamic pressure thus produced minimizes the friction between the rotating shaft 51 and radial bearing 55 and assures a smooth rotation of the rotating shaft 51.

The housing 56 having enclosed therein the radial bearing 55 that supports the rotating shaft 51 is shaped to enclose the cylindrical radial bearing 55, as will be seen from FIG. 6. It is a member integrally formed by molding a synthetic resin.

As shown in FIG. 6, the housing 56 includes a cylindrical housing body 61, a bottom portion 62 formed integrally with the housing body 61 to close the housing body 61 at one end of the latter, and a top portion 63 also formed integrally with the housing body 61. The top portion 63 has formed in the center thereof a shaft insertion hole 65 through which the rotating shaft 51 is received rotatably in the radial bearing 55 enclosed in the housing 56. A thrust bearing 66 is formed integrally with and in the center of the inner surface of the bottom portion 62 of the housing 56. The thrust bearing 66 supports the rotating shaft 51 received in the radial bearing 55. More specifically, the rotating shaft 51 has a bottom end portion 51a formed at one of thrusting-directional ends thereof, or at the bottom end thereof in this case, and the thrust bearing 66 supports the bottom end portion 51a of the rotating shaft 51 to be rotatable. The thrust bearing 66 is formed from a part of the bottom portion 62 of the housing 56 that is projected inwardly or upwardly in this case. The bottom end portion 51a of the rotating shaft 51 is formed to have a circular or tapered shape, and thus the thrust bearing 66 is formed as a pivot bearing for point-supporting the bottom end portion 51a of the rotating shaft 51.

By out-sert molding of a synthetic resin onto the cylindrical radial bearing 55 into the housing 56 constructed as above, the radial bearing 55 is formed integrally inside the housing 61.

The synthetic resin used to mold the housing 56 is not limited to any special one but should desirably be one which will increase the angle of contact when repelling the lubricant 57 filled in the housing 56. Since the housing 56 has the thrust bearing 66 formed integrally therewith, it should desirably be formed from a synthetic resin excellent in lubricity. Therefore, the housing 56 should preferably be formed from a fluorinated synthetic resin, such as polyimide, polyamide, polyacetal or the like, or a synthetic resin such as polytetrafluoroethylene teflon, nylon or the like. Further, a synthetic resin such as PC (polycarbonate), ABS (acrylonitrile butadiene styrene) or the like may be used for this purpose. Moreover, the housing 56 may be formed from a liquid crystal polymer that can be molded with an extremely high accuracy.

Thus, the rotating shaft 51 is rotatably supported in the radial bearing 55 enclosed in the housing 56 and on the thrust bearing 66 formed integrally with the housing 56. The rotating shaft 51 includes a shaft portion 51b in addition to the aforementioned bottom end portion 51a. The bottom end portion 51a supported on the thrust bearing 66 is formed circular or tapered as mentioned above. The rotating shaft 51 also has formed at the other end (top end) thereof a fixing portion 52 to which the rotor 31 of a rotating body, for example, of the motor 12, is fixed. It should be noted that the shaft body 51b and fixing portion 52 are formed to have the same diameter.

As shown in FIG. 6, the rotating shaft 51 is supported at the bottom end portion 51a thereof on the thrust bearing 66, while the shaft body 51b is supported at the outer surface thereon on the radial bearing 55, with the fixing portion 52 provided at the other end (top end) of the rotating shaft 51 being projected to outside through the shaft insertion hole 65 formed in the top portion 63 of the housing 56.

Note that the shaft insertion hole 65 is formed to have a somewhat larger diameter than the outside diameter of the shaft body 51b, so that the rotating shaft 51 inserted through the shaft insertion hole 65 can be rotated with no contact or friction with the inner surface of the shaft insertion hole 65. More specifically, the shaft insertion hole 65 is formed to define between the inner surface thereof and outer surface of the shaft body 51b a gap 69 whose width c is sufficient to prevent the lubricant 57 filled in the housing 56 from leaking out of the housing 56. As seen from the foregoing, an oil sealing is provided by the top portion 63 of the housing 56 in which there is formed the shaft insertion hole 65 defining, along with the outer surface of the rotating shaft 51, the gap 69 whose width is sufficient to prevent the leakage of lubricant 57 filled in the housing 56.

Because the top portion 63 formed integrally with the housing body 61 is formed from a synthetic resin such as polyimide, polyamide or nylon, it assures an angle of about 60 deg., at which the inner surface of the shaft insertion hole 65 is in contact with the lubricant 57. The bearing unit 30 according to the present invention thus assures a larger angle of contact of the lubricant 57 with the inner surface of the shaft insertion hole 65 in the top portion 63 of the housing 56, without having to apply any surfactant to the top portion 63 providing the oil sealing and including the inner surface of the shaft insertion hole 65. Hence, the lubricant 57 can be prevented from leaking to outside the housing 56 through the shaft insertion hole 65 by a centrifugal force developed as the rotating shaft 51 rotates.

Further, the rotating shaft 51 is tapered (as indicated at a reference 67) at a surface portion thereof opposite to the inner surface of the shaft insertion hole 65. The tapered portion 67 increases the gap 69 defined between the outer surface of the rotating shaft 51 and the inner surface of the shaft insertion hole 65 outwardly of the housing 56. The tapered portion 67 imparts a pressure gradient in the gap 69 defined between the outer surface of the rotating shaft 51 and the inner surface of the shaft insertion hole 65 such that there will develop a force to cause the lubricant 57 filled in the housing 56 to move inwardly of the housing 56. Since the lubricant 57 is thus moved inwardly of the housing 56 when the rotating shaft 51 rotates, it will positively enter the dynamic pressure producing recesses 58 in the radial bearing 55 formed from a dynamic-pressure fluid bearing to produce a dynamic pressure which will assure a stable supporting of the rotating shaft 51 and prevent the lubricant 57 filled in the housing 56 from leaking out of the latter.

Figure 8:
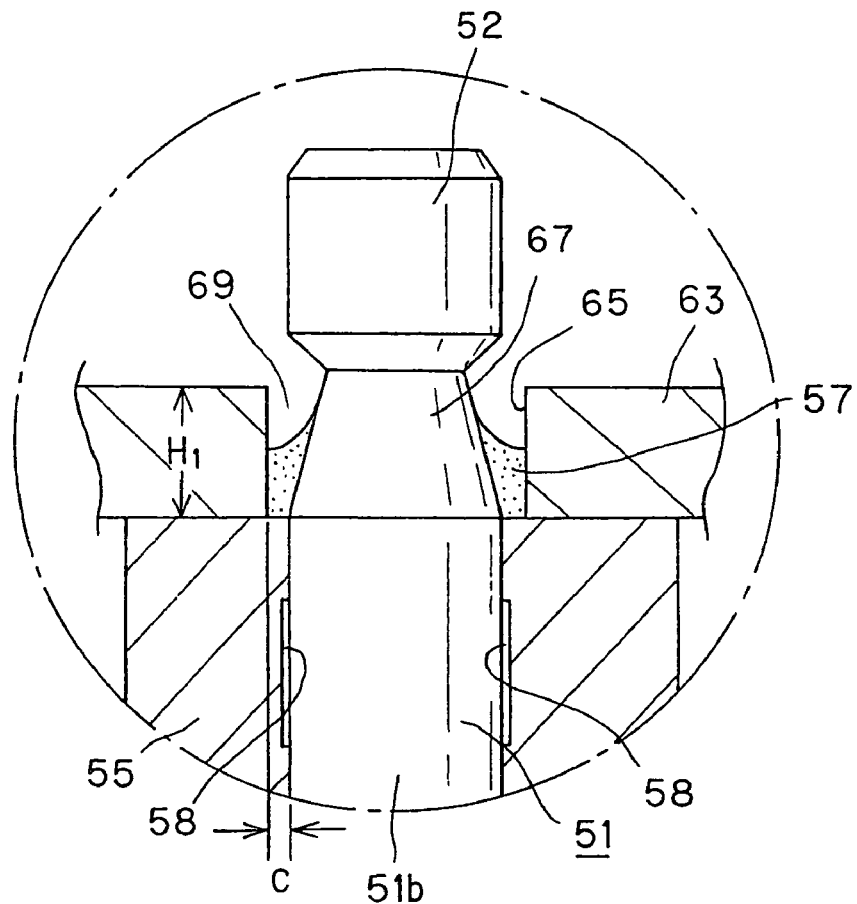
FIG. 8 is a sectional view of a gap formed by the outer surface of the rotating shaft and the inner surface of the shaft insertion hole in a housing.

In the bearing unit 30 according to the present invention, the lubricant 57 entering the dynamic pressure producing recesses 58 formed in the radial bearing 55 formed from the dynamic-pressure fluid bearing to produce a dynamic pressure is filled into the housing 56 up to the gap 69 defined between the tapered portion 67 of the rotating shaft 51 and the inner surface of the shaft insertion hole 65, as shown in FIGS. 6 and 8. That is, the lubricant 57 is filled into clearances inside the housing 56 and further impregnated into the radial bearing 55 formed from a sintered metal.

The gap 69 defined between the tapered portion 67 of the rotating shaft 51 and the inner surface of the shaft insertion hole 65 will further be described hereinbelow. The minimum width of the gap 69 is equivalent to the width c defined between the outer surface of the rotating shaft 51 and the inner surface of the shaft insertion hole 65. The width c of the gap 69 should desirably be 20 to 200, and more preferably should be on the order of 100 μm. If the width c of the gap 69 is smaller than 20 μm, it is difficult to mold a synthetic resin into an integrally formed housing 56 of the bearing unit 30 with a high accuracy. Also, if the width c of the gap 69 is larger than 200 μm, when a shock is applied to the bearing unit 30, the lubricant 57 filled in the housing 56 will fly out of the housing 56, namely, the shock resistance of the housing 56 will be lower.

The above shock resistance will be indicated with a symbol G. The shock resistance G is given by a following equation (1):

$$G = (12\gamma \cos \beta / 2\rho c^2)/g \qquad (1)$$

where γ: Surface tension of the lubricant
 β: Angle of contact of the lubricant
 ρ: Density of the lubricant
 c: Gap between the rotating shaft and shaft insertion hole
 g: Free-fall speed As seen from the above equation (1), the shock resistance G is inversely proportional to the width c of the gap 69.

Also, a thermal expansion-caused rise of the lubricant level, indicated with a symbol h, is given by a following equation (2):

$$h = V\alpha\Delta t / 2\pi Rc \qquad (2)$$

where V: Filled amount of the lubricant
 α: Thermal expansion coefficient
 Δt: Temperature change
 R: Radius of the rotating shaft As known from the equation (2), the rise h of the lubricant level is inversely proportional to the magnitude of the width c. So, in the case where the width c is decreased, the shock resistance G is improved but the level of the lubricant 57 will be caused to violently rise due to a temperature elevation, and thus the shaft insertion hole 65 will have to be deeper axially of the housing 56.

The results of calculation show that in the bearing unit 30 having the rotating shaft 51 having a diameter of 2 to 3 mm, when the width c of the gap 69 defined between the outer surface of the rotating shaft 51 and the inner surface of the shaft insertion hole 65 is on the order of 100 μm and the shaft insertion hole 65 is about 1 mm deep ($H_1$), the housing 56 will have a sock resistance more than 1000 G and a thermal resistance of 80° C. In this case, the bearing unit 30 can prevent the lubricant 57 filled in the housing 56 from flying out of the latter, and thus it is highly reliable.

Further, since in the bearing unit 30, the tapered portion 67 of the rotating shaft 51 increases the width c of the gap 69 defined between the outer surface of the rotating shaft 51 and the inner surface of the shaft insertion hole 65 outwardly of the housing 56, there will take place a pressure gradient in the width c of the gap 69 defined between the outer surface of the rotating shaft 51 and the inner surface of the shaft insertion hole 65, such that under a centrifugal force developed when the rotating shaft 51 rotates, there will take place a force with which the lubricant 57 filled in the housing 56 is moved inwardly of the latter.

That is, in the bearing unit 30 according to the present invention, the gap 69 defined between the outer surface of the rotating shaft 51 and the inner surface of the shaft insertion hole 65 provides a surface tension seal to prevent the lubricant 57 from flying out of the housing 56.

Figure 9:
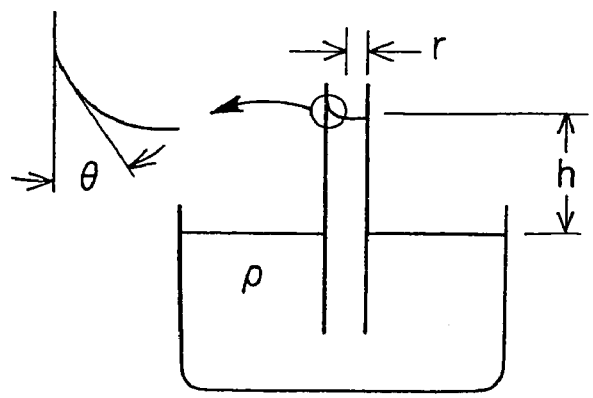
FIG. 9 explains the capillary phenomenon of a fluid.

The surface tension seal will further be described below. The surface tension seal is a technique using the capillary phenomenon of a fluid. A rise h of a fluid through a capillary tube, as shown in FIG. 9, is given by a following equation (3):

$$2\pi r\gamma \cos \theta = mg \qquad (3)$$

The term m in the above equation (3) is given by a following equation (4):

$$m = \pi r^2 h\rho \qquad (4)$$

where m: Fluid mass within range of rise h inside the capillary tube
r: Radius of the capillary tube
γ: Surface tension of a viscous fluid
θ: Angle of contact of the viscous fluid
ρ: Density of the viscous fluid
g: Gravitational acceleration A following equation (5) is derived from equations (3) and (4):

$$h = 2\gamma \cos \theta / r\rho g \quad (5)$$

Generally, the relation between a suction pressure P and level of a fluid is given by a following equation (6):

$$P = \rho g h \quad (6)$$

The suction pressure P can be given by the following equation (7) based on equations (5) and (6):

$$P = 2\gamma \cos \theta / r \quad (7)$$

In equation (7), the suction pressure P means a pressure under which the fluid is moved inwardly of the housing 56. It will be known from equation (7) that the suction pressure P will be higher with the capillary tube being larger in diameter.

Figure 10:
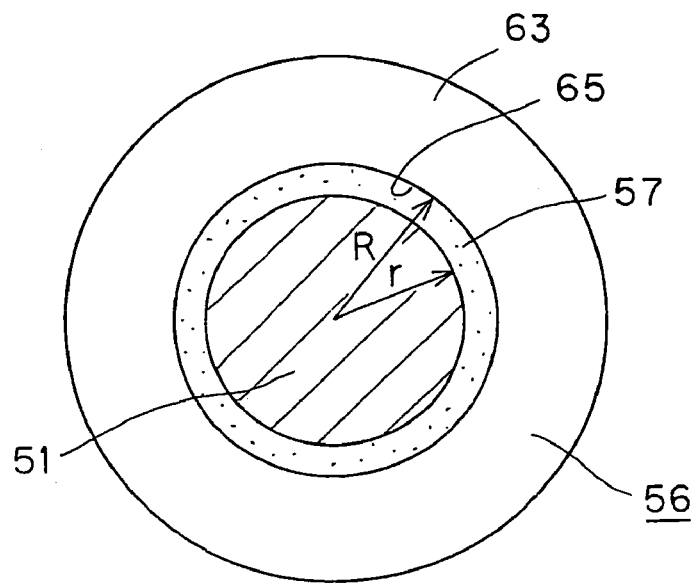
FIG. 10 is a cross-sectional view of a lubricant having entered the gap defined between the outer surface of the rotating shaft and the inner surface of the shaft insertion hole.

The explanation applies for a capillary tube whose section is circular. In the bearing unit 30, however, the lubricant 57 having entered the gap 69 defined between the outer surface of the rotating shaft 51 and the inner surface of the shaft insertion hole 65 has a toroidal section as shown in FIG. 10. In this case, the rise h1 of the lubricant 57 as fluid through the capillary tube is given by the following equation (8):

$$2\pi(R+r)\gamma \cos \theta = mg \quad (8)$$

The term m in the equation (8) is given by the following equation (9):

$$m = \pi(R^2 - r^2) h \rho \quad (9)$$

The following equation (10) is derived from the equations (8) and (9):

$$h_1 = (2\gamma \cos \theta) / ((R - r)\rho g) \quad (10)$$

On the assumption that the term (R−r) is the width c of the gap 69 defined between the outer surface of the rotating shaft 51 and the inner surface of the shaft insertion hole 65, the equation (10) will be given by the following equation (11):

$$h = (2\gamma \cos \theta) / (c \rho g) \quad (11)$$

Therefore, in case the section of the lubricant 57 is toroidal, the suction pressure P is given by the following equation (12):

$$P = 2\gamma \cos \theta / c \quad (12)$$

When the width c of the gap 69 defined between the outer surface of the rotating shaft 51 and the inner surface of the shaft insertion hole 65 is 0.02 cm (0.2 mm), the surface tension γ of a viscous fluid is 30 dyn/cm$^2$ and the contact angle θ of the lubricant 57 is 15°, and the suction pressure P is determined by the following equation (13) to be $2.86 \times 10^{-3}$ (atm):

$$P = 2 \times 30 \times \cos 15° / 0.02 = 3.00 \times 10^3 \text{ dyn/cm}^2 = 2.86 \times 10^{-3} \text{ (atm)} \quad (13)$$

As known from the above equation (12), the suction pressure P will be higher when the width c of the gap 69 is smaller. Therefore, the tapered portion 67 of the rotating shaft 51 will permit the lubricant 57 to move as a viscous fluid in the direction in which the width c of the gap 69 is smaller, that is, inwardly of the housing 56.

Figure 11:
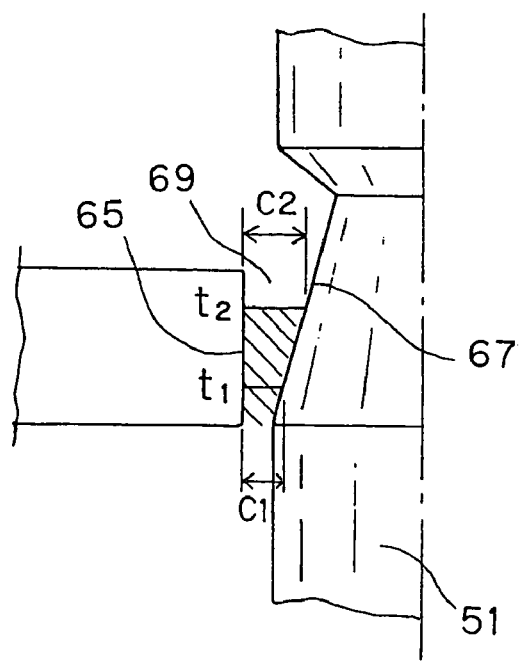
FIG. 11 is an axial-sectional view of the gap defined between the outer surface of the rotating shaft and the inner surface of the shaft insertion hole, explaining the difference in suction pressure at portions, having different diameters, of a tapered portion of a rotating shaft.

It is assumed here that, as shown in FIG. 11, the tapered portion 67 of the rotating shaft 51 has portions t1 and t2 different in diameter from each other, for example. In this case, since a gap c1 defined between the outer surface of the rotating shaft 51 and the inner surface of the shaft insertion hole 65 and taken at the level of the portion t1 and a gap c2 defined between the outer surface of the rotating shaft 51 and the inner surface of the shaft insertion hole 65 and taken at the level of the portion t2 are in such a relation that c1<c2, so suction pressures P1 and P2 at the portions t1 and t2 are in such a relation that P1>P2 and the suction pressure P forcing the lubricant 57 inwardly of the housing 56 increases as the width c of the gap 69 defined between the outer surface of the rotating shaft 51 and the inner surface of the shaft insertion hole 65 is smaller, as will be known from the equation (12).

Thus, by forming the tapered portion 67 of the rotating shaft 51 such that the width c of the gap 69 defined between the outer surface of the rotating shaft 51 and the inner surface of the shaft insertion hole 65, and which defines such an oil seal as prevents the lubricant 57 filled in the housing 56 from leaking out of the housing 56, is smaller inwardly of the housing 56, a pressure gradient will develop in the lubricant 57 in the gap 69 defined between the outer surface of the rotating shaft 51 and the inner surface of the shaft insertion hole 65. That is, the pressure gradient imparted to the lubricant 57 will be larger inwardly of the housing 56 in which direction the width c of the gap 69 is smaller. Since the suction pressure P forcing the lubricant 57 inwardly of the housing 56 is always acting on the lubricant 57 because of such a pressure gradient developed in the lubricant 57, the lubricant 57 staying in the gap 69 will have no air mixed therein even when the rotating shaft 51 rotates.

Figure 12:
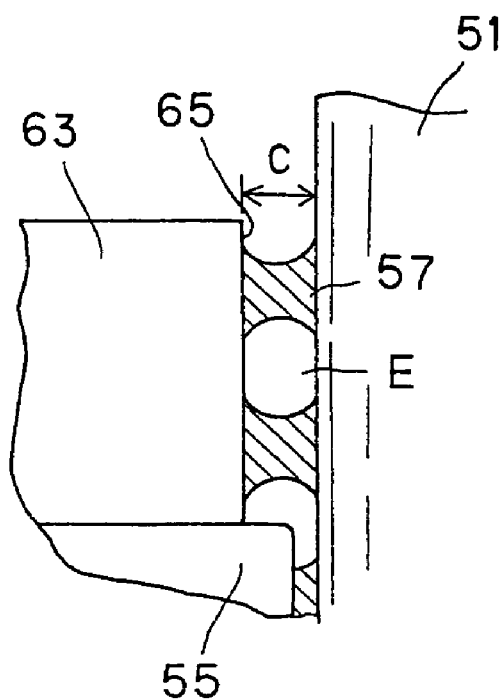
FIG. 12 is an axial-sectional view of the gap defined between the outer surface of the rotating shaft and the inner surface of the shaft insertion hole, showing the lubricant having entered the gap and having air mixed in the lubricant.

In case the tapered portion 67 is not formed on the rotating shaft 51, namely, when the width c of the gap 69 defined between the outer surface of the rotating shaft 51 and the inner surface of the shaft insertion hole 65 has the diameter thereof not changed along the depth of the shaft insertion hole 65, as shown in FIG. 12, no pressure gradient will develop in the lubricant 57 having entered the gap 69 defined between the outer surface of the rotating shaft 51 and the inner surface of the shaft insertion hole 65, so that the lubricant 57 will stay uniformly in the gap 69. That is to say, the gap 69 defined between the outer surface of the rotating shaft 51 and the inner surface of the shaft insertion hole 65 works as an oil seal when its width c is reduced. The lubricant 57 having entered the gap 69 having such a reduced width c will move inside the gap 69 and have air E mixed therein as the case may be. If the lubricant 57 has air E mixed therein, the air E will be expanded due to a temperature change, barometric pressure change, etc. and cause the lubricant 57 to fly out of the housing 56 through the gap 69 forming the oil seal.

On the contrary, by forming the tapered portion 67 of the rotating shaft 51 so that the width c of the gap 69 defined between the outer surface of the rotating shaft 51 and the inner surface of the shaft insertion hole 65 is smaller inwardly of the housing 56 as in the bearing unit 30 according to the present invention, such a pressure gradient that the pressure will be higher inwardly of the housing 56 will take place in the lubricant 57 having entered the gap 69, and so the lubricant 57 can be prevented from having the air E mixed therein when the rotating shaft 51 rotates.

Further, the tapered portion 67 of the rotating shaft 51 prevents the lubricant 57 having entered the gap 69 defined between the outer surface of the rotating shaft 51 and the inner surface of the shaft insertion hole 65 from flying outwardly of the housing 56 and moves the lubricant 57 to the entire outer surface of the rotating shaft 51 even when the rotating shaft 51 becomes eccentric with respect to the shaft insertion hole 65 formed in the housing 56. Thus, it is possible to prevent the lubricant 57 on the circumference of the rotating shaft 51 from running short and assure a stable rotation of the rotating shaft 51.

Figure 13:
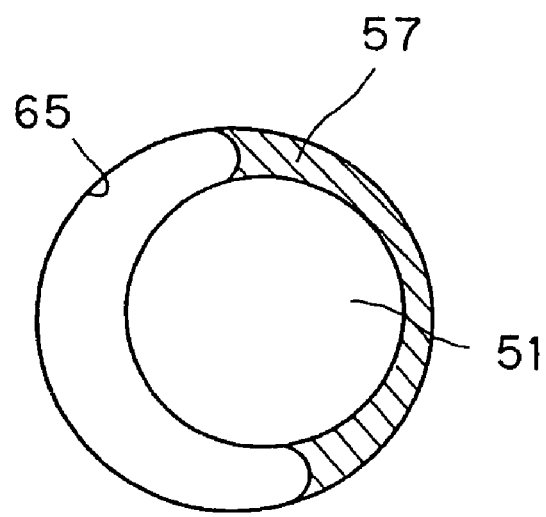
FIG. 13 is a cross-sectional view of the gap defined between the outer surface of the rotating shaft and the inner surface of the shaft insertion hole, showing that the lubricant in the gap is cut.

In case the rotating shaft 51 has not the aforementioned tapered portion 67, if the rotating shaft 51 becomes eccentric with respect to the shaft insertion hole 65 in the housing 56, the lubricant 57 will concentrate to the gap portion, whose width c is smaller, defined between the outer surface of the rotating shaft 51 and the inner surface of the shaft insertion hole 65, while it will be cut in the gap portion whose width c is larger and thus have air E mixed therein, as shown in FIG. 13. The air E mixed in the lubricant 57 will be expanded due to any temperature change, barometric pressure change or the like and thus cause the lubricant 57 to fly outwardly of the housing 56 through the gap 69 forming the air seal.

Figure 14:
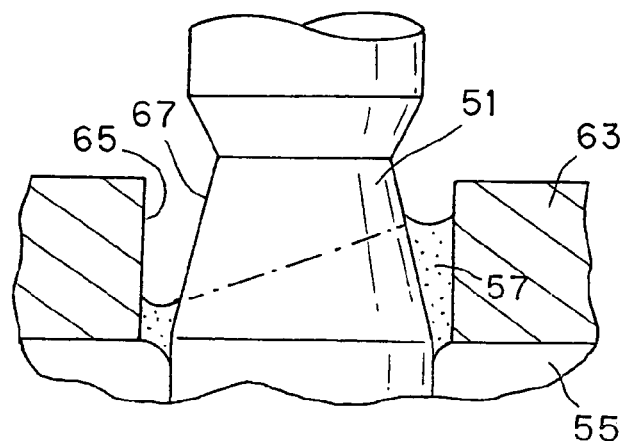
FIG. 14 is an axial-sectional view of the rotating shaft positioned in an off-center relation with the shaft insertion hole in the housing.
Figure 15:
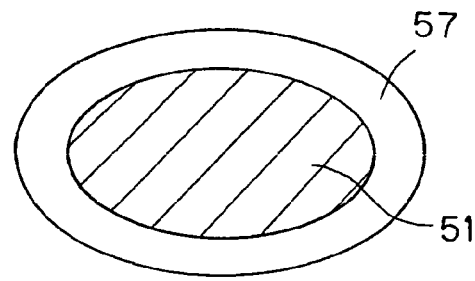
FIG. 15 is a sectional view of the gap defined between the outer surface of the rotating shaft and the inner surface of the shaft insertion hole, showing the lubricant in the gap when the rotating shaft is eccentric with respect to the shaft insertion hole in the housing.

On the other hand, in case the rotating shaft 51 is shaped to have the tapered portion 67 as in the bearing unit 30 according to the present invention, even if the rotating shaft 51 becomes eccentric with respect to the shaft insertion hole 65 in the housing 56, the gap 69 of the same width c is defined on the elliptic trajectory along which the eccentric rotating shaft 51 rotates, as shown in FIG. 14, and the width c of the gap 69 defined between the outer surface of the rotating shaft 51 on the elliptic trajectory and the inner surface of the shaft insertion hole 65 is constant all around the rotating shaft 51 as shown in FIG. 15. So, the lubricant 57 will not concentrate to the gap 69 of the smaller width c. Thus, the lubricant 57 can be prevented from flying out of the gap 69 and, hence, out of the housing 56.

Figure 16:
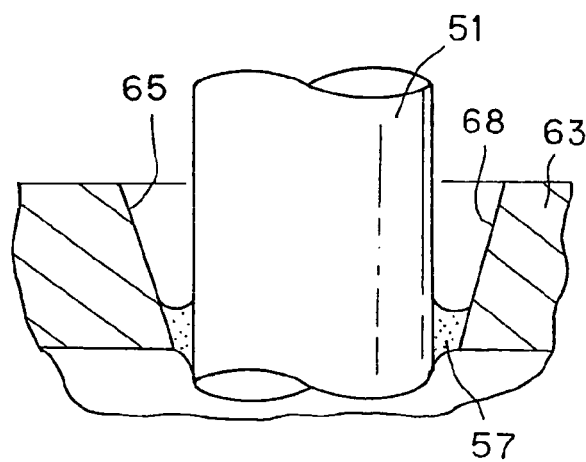
FIG. 16 is a sectional view of a variant of the first embodiment of the bearing unit according to the present invention, showing that the shaft insertion hole in the housing has a tapered portion.

In the above bearing unit 30, the rotating shaft 51 includes the tapered portion 67, but the inner surface of the shaft insertion hole 65 in the housing 56 may be tapered (indicated at a reference 68) as shown in FIG. 16.

Next, the production process for the bearing unit 30 according to the present invention, constructed as above, will be described.

To produce the bearing unit 30 according to the present invention, the housing 56 is formed on the outer surface of the radial bearing 55 by out-sert molding of a synthetic resin. At this time, the thrust bearing 66 is integrally inside the housing 56. More specifically, when the housing 56 is formed by the out-sert molding, the radial bearing 55 is joined to the inner surface of the housing 56 and securely held in place between the top and bottom portions 63 and 62 formed integrally on the top and bottom, respectively, of the cylindrical housing body 61. Thus, the radial bearing 55 is fixed in place.

Next, the rotating shaft 51 is introduced into the housing 56 through the shaft insertion hole 65 formed in the top portion 63 of the housing 56. Namely, the rotating shaft 51 is inserted into the radial bearing 55 down to the thrust bearing 66 formed on the bottom portion 62 of the housing 56. The rotating shaft 51 thus supported at the bottom end portion 51a thereof on the thrust bearing 66 and in the radial bearing 55 is received rotatably in the housing 56.

After the rotating shaft 51 is inserted in the housing 56, the lubricant 57 is filled into the housing 56. For this filling of the lubricant 57, the housing 56 having the rotating shaft 51 inserted therein is immersed in the lubricant 57 in a bath, and then the lubricant bath in which the housing 56 is placed is put into a vacuumization apparatus in which it is vacuumized. After completion of the vacuumization, the lubricant bath is taken out of the vacuumization apparatus into the atmosphere. The lubricant 57 is thus filled in the housing 56.

The lubricant 57 thus filled in the housing 56 will not leak out of the housing 56 through the shaft insertion hole 65, even when it is expanded due to a temperature change, and will not run short in the gap 69 defined between the rotating shaft 51 and the inner surface of the shaft insertion hole 65, even when it is shrunk due to a temperature change. Namely, the lubricant 57 will always keep a level within the depth of the shaft insertion hole 65, even when the ambient temperature varies.

By filling the lubricant 57 into the housing 56 through the above-mentioned vaccumization of the lubricant bath in the vacuumization apparatus, the internal pressure of the housing 56 will be lower than the external one. As a result, the lubricant 57 will be prevented from easily leaking out of the housing 56.

Since the bearing unit 30 according to the present invention has the radial bearing 55 thereof made of a sintered metal, the radial bearing 55 is filled with the lubricant 57, and also the dynamic pressure producing recesses 58 formed in the inner surface of the radial bearing 55 are filled with the lubricant 57. When the rotating shaft 51 rotates, the dynamic pressure producing recesses 58 will produce a dynamic pressure. Namely, the housing 56 has the lubricant 57 filled in all gaps therein.

The aforementioned bearing unit has the housing thereof formed from a synthetic resin by molding. However, the material of the housing is not limited to any special synthetic resin, but it may be a synthetic resin containing a metallic material moldable in a mold tool or any other molding material. It should be noted that when the housing is formed from any other material than a synthetic resin, any appropriate angle of contact of the lubricant filled in the housing with the inner surface of the through-hole formed in the housing may not possibly be maintained. In such a case, however, it suffices to provide a larger angle of contact by applying a surfactant to the inner surface of the through-hole formed in the housing and also to the outer surface of the top portion including the inner surface of the through-hole.

In the aforementioned bearing unit, the thrust bearing is formed as a part of the housing. However, the bottom portion of the housing where the thrust bearing is formed may be formed independently of the housing body and may be joined to the housing body by heat or ultrasonic sealing.

Next, there will be described a variant of the bearing unit that is constructed by first forming, independently of a housing body, a housing bottom portion having a thrust bearing formed thereon, and then joining it to the housing body.

Note that in the following explanation and illustration, the same or similar elements of the bearing unit as those of the aforementioned bearing unit 30 will be indicated with the same or similar references as those used in the illustration and explanation of the beating unit 30 and will not be described in detail any longer.

Figure 17:
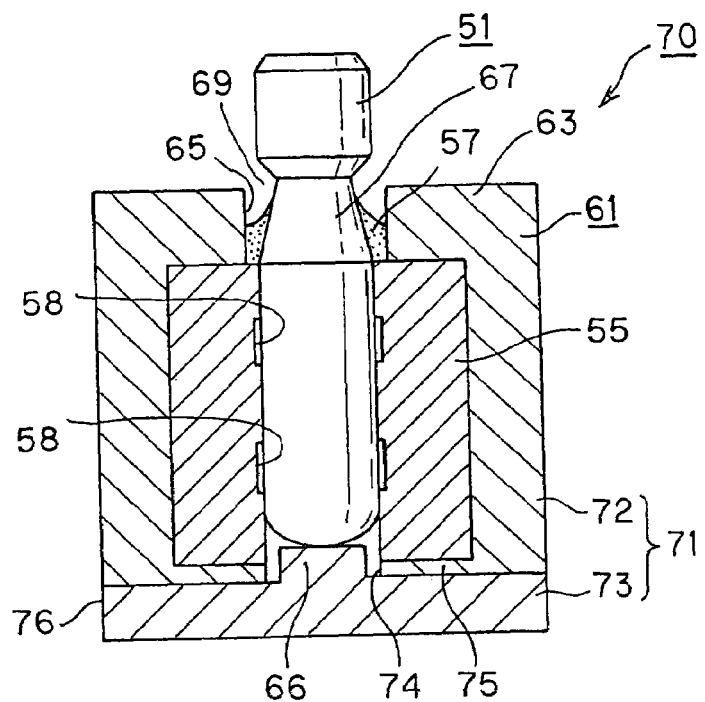
FIG. 17 is an axial-sectional view of a second embodiment of the bearing unit according to the present invention.

The second embodiment of the bearing according to the present invention is generally indicated with a reference 70. The bearing unit 70 includes a housing 71 consisting of two members: a housing body 72 formed to receive a radial bearing 55 designed as a dynamic-pressure fluid bearing, and a housing bottom closer 73, having a thrust bearing 66 formed integrally thereon, as shown in FIG. 17. Similar to the housing body 61 of the aforementioned bearing unit 30, the housing body 72 is formed by out-sert molding of a synthetic resin on the outer surface of the radial bearing 55, and has formed in the center of the top portion 63 the shaft insertion hole 65 through which the rotating shaft 51 is introduced into the radial bearing 55 in which it will be supported rotatably. According to this second embodiment, the housing body 72 has the bottom portion 75 formed at the bottom thereof and in which there is formed a through-hole 74 through which the thrust bearing 66 provided on the housing bottom closer 73 is projected inwardly of the housing body 72. Thus, the radial bearing 55 enclosed in the housing body 72 is securely held in place between the top and bottom portions 63 and 75.

The housing bottom closer 73 joined to the housing body 72 has formed thereon the inwardly projecting thrust bearing 66 that supports a circular or tapered bottom end portion 51*a* of the rotating shaft 51 inserted in the radial bearing 55. The thrust bearing 66 serves as a pivot bearing for point-supporting of the bottom end portion 51*a* of the rotating shaft 51. With the thrust bearing 66 being projected inwardly of the housing body 72 through the through-hole 74, a peripheral fixing portion 76 around the thrust bearing 66, namely, a portion of the housing bottom closer 73 not including the thrust bearing 66, is welded to the bottom portion 75 of the housing body 72. The housing bottom closer 73 welded to the bottom portion 75, namely, to the housing body 72, seals the through-hole 74 in the bottom portion 75. Thus, the housing 71 has a sealed structure except for the shaft insertion hole 65 having the rotating shaft 51 inserted therein to provide an oil seal.

The housing bottom closer 73 is joined by ultrasonic welding of the fixing portion 76 to the bottom portion 75 of the housing body 72. The side of the fixing portion 76 to be welded to the bottom portion 75 has provided a ring-shaped energy director whose section is triangular. With the energy director set to abut the bottom portion 75, the housing bottom closer 73 is combined with the housing body 72. This assembly is set in an ultrasonic welding apparatus. In this condition, an ultrasound transducer of the ultrasound welding apparatus emits an ultrasound oscillation from the side of the housing bottom closer 73. The ultrasound oscillation is concentrated to the energy director, which will thus be melted to weld the housing bottom closer 73 to the housing body 72.

By forming the housing body 72 and the housing bottom closer 73 having the thrust bearing 66 formed thereon independently of each other, it is possible to form the housing body 72 and housing bottom closer 73 from appropriate materials for their respective functions, respectively. The housing body 72, having the top portion 63 in which the shaft insertion hole 65 forming an oil seal is formed, should desirably be formed with a high precision. To this end, the housing body 72 is formed from a liquid crystal polymer that can be molded with a high precision of molding, while the housing bottom closer 73 having the thrust bearing 66 formed integrally therewith is formed from a polytetrafluoroethylene teflon that is a fluorinated synthetic resin having a high slidability and sufficient mechanical strength, such as polyimide, polyamide, polyacetal or the like. It should be noted that both the housing body 72 and housing bottom closer 73 may be formed from the liquid crystal polymer. The liquid crystal polymer is a resin superb in rotational slidability, and thus it is ideal for use as the material of the housing bottom closer 73 having the thrust bearing 66 formed integrally therewith.

The housing bottom closer 73 may be formed on the housing body 72 having been formed over the radial bearing 55 to form the housing 71 by the out-sert molding. Thus, the housing bottom closer 73 is integral with the housing body 72. In this case, the housing bottom closer 73 is formed from a synthetic resin that is moldable at a temperature lower than the highest temperature the synthetic resin material of the housing body 72 can withstand, for the housing body 72 should be prevented from being expanded and damaged by the molding temperature or the precision of molding should be maintained when forming the housing bottom closer 73 on the housing body 72 by the out-sert molding.

In the aforementioned bearing units 30 and 70 according to the present invention, the rotating shaft 51 is formed from a metal, and the bottom end portion 51*a* of the rotating shaft 51, supported on the thrust bearing 66, is formed circular or tapered. That is, the thrust bearing 66 is formed as a pivot bearing. Therefore, the thrust bearing 66 preferably should be formed from a metal superb in slidability and abrasion resistance.

Figure 18:
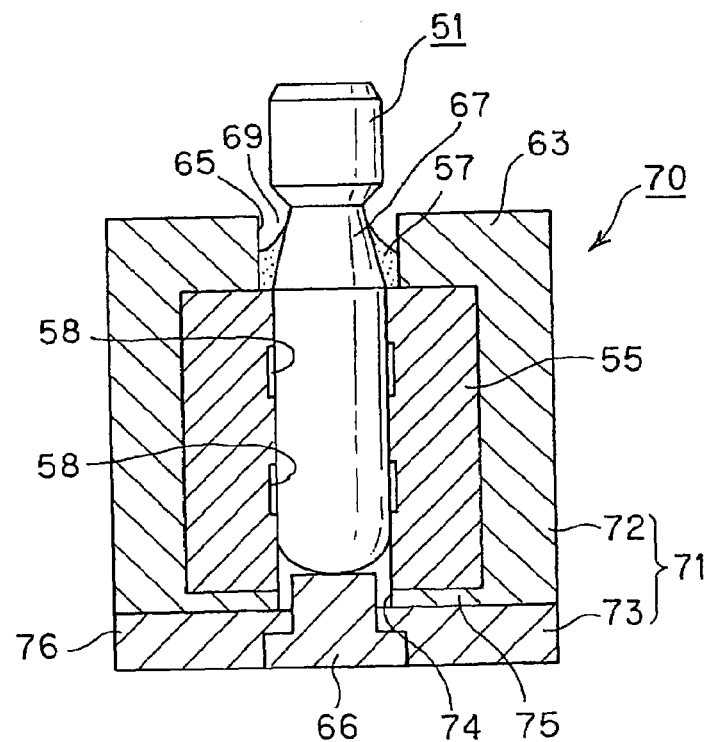
FIG. 18 is an axial-sectional view of a variant of the second embodiment of the bearing unit shown in FIG. 17.

FIG. 18 is an axial-sectional view of a variant of the aforementioned bearing unit 70. In case the thrust bearing 66 is formed from a metal, a synthetic resin is molded, by the insert molding, onto the metallic thrust bearing 66 to form the housing bottom closer 73. The housing bottom closer 73 is joined by ultrasonic welding to the housing body 72. Thus, it is integral with the housing body 72.

The bearing unit according to the present invention desirably should be designed to prevent the rotating shaft from coming off the housing, in order to ensure a stable rotation of the rotating shaft.

The bearing unit provided with a come-off preventive mechanism to prevent the rotating shaft from coming off the housing will be described hereinbelow:

Note that in the following illustration and explanation, the same or similar elements of the bearing unit as those of the bearing unit 30 shown in FIGS. 5 and 6 will be indicated with the same or similar references as those in FIGS. 5 and 6 and will not be explained in detail any longer.

Figure 19:
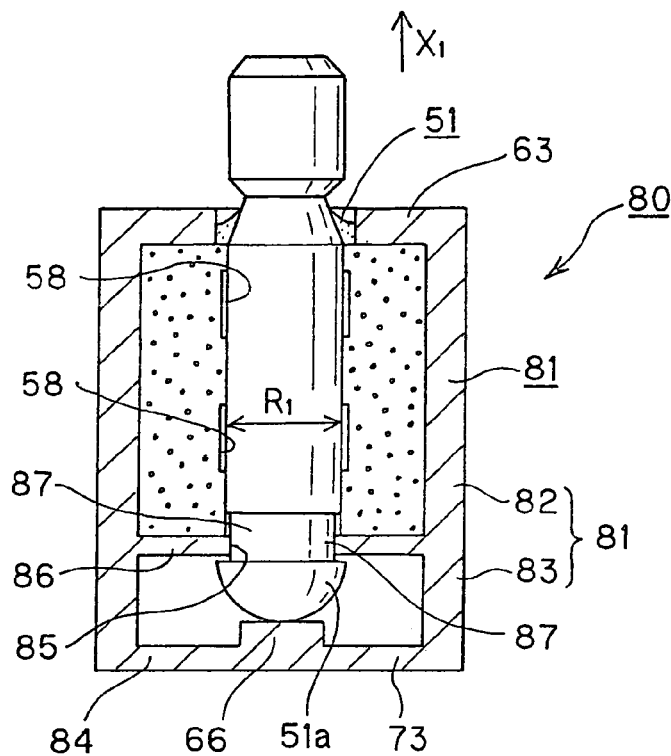
FIG. 19 is an axial-sectional view of a third embodiment of the bearing unit according to the present invention.

The bearing unit provided with a come-off preventive mechanism is shown as a third embodiment of the present invention in FIG. 19. It is generally indicated with a reference 80. As shown, the bearing unit 80 includes a housing 81 composed of a housing body 82 having the radial bearing 55 encased therein and a shaft end receptacle 83 in which the thrust bearing 66 is received. The shaft end receptacle 83 includes a housing bottom closer 84 having the thrust bearing 66 formed integrally therewith. The shaft end receptacle 83 is coupled integrally to the housing body 82 to form the housing 81. The housing 81 also is formed from a synthetic resin similarly to the aforementioned bearing units 30 and 70.

The housing body 82 has a shaft retainer 86 formed integrally at the bottom thereof to which the shaft end receptacle 83 is coupled. The shaft retainer 86 has formed in the center thereof a through-hole 85 in which there is inserted one end of the rotating shaft 51, on which the bottom end portion 51*a* is formed. The through-hole 85 has a diameter smaller than the radius R1 of the rotating shaft 51 received in the housing 81. The shaft retainer 86 cooperates with the top portion 63 of the housing body 82 to support the radial bearing 55 encased in the housing body 82.

On the other hand, the rotating shaft 51 has formed in a portion thereof an engagement groove 87 in which the shaft retainer 86 is engaged when the rotating shaft 51 is introduced into the housing 81.

The rotating shaft 51 is inserted first at the bottom end portion 51*a* thereof into the housing 81 until the bottom end portion 51*a* is seated on the thrust bearing 66. Then, the shaft retainer 86 is engaged in the engagement groove 87. More specifically, the shaft retainer 86 is elastically deformed as the bottom end portion 51a of the rotating shaft 51 is inserted into the through-hole 85. Then, the rotating shaft 51 is inserted until it is seated at the bottom end portion 51a thereof on the thrust bearing 66. Then, the shaft retainer 86 is aligned with the engagement groove 87 whose diameter is smaller than the former. The shaft retainer 86 having been elastically deformed as above is elastically restored to its initial condition and engaged into the engagement groove 87. Since the shaft retainer 86 is thus engaged in the engagement groove 87, the rotating shaft 51 is limited from moving in the direction of arrow $X_1$ in FIG. 19 and thus prevented from coming off the housing 81.

In this embodiment, the housing 81 may be formed by out-sert molding of the shaft end receptacle 83 on the housing body 82 made of a synthetic resin. Also, the housing 81 may be joined by thermal ultrasonic welding of the synthetic resin-made shaft end receptacle 83 to the synthetic resin-made housing body 82.

Figure 20:
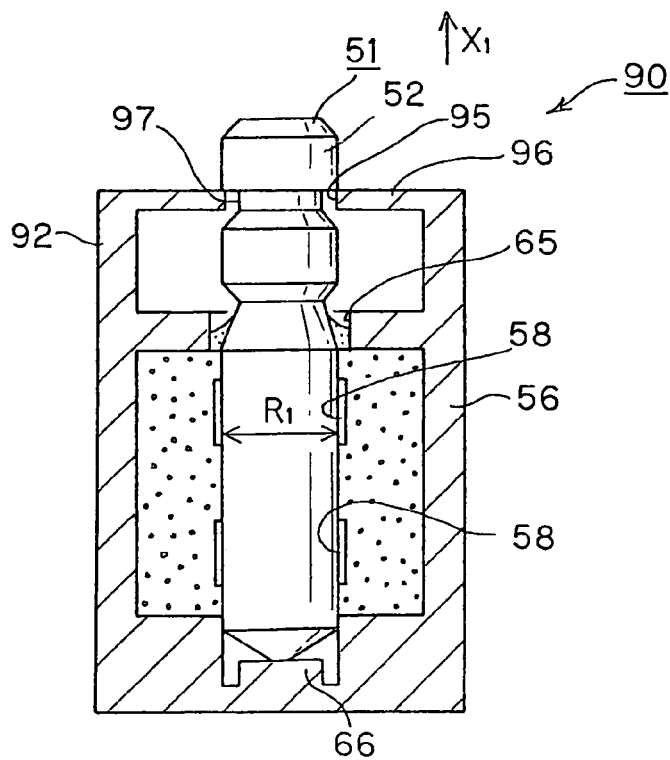
FIG. 20 is an axial-sectional view of a fourth embodiment of the bearing unit according to the present invention.

FIG. 20 shows a fourth embodiment of the bearing unit according to the present invention. It is provided with a come-off preventive mechanism to prevent the rotating shaft from coming off the housing.

Note that in the following illustration and explanation, the same or similar elements of the bearing unit as those of the bearing unit 30 shown in FIGS. 5 and 6 will be indicated with the same or similar references as those in FIGS. 5 and 6 and will not be explained in detail.

The bearing unit is generally indicated with a reference 90. As shown in FIG. 20, the bearing unit 90 is provided with a come-off preventive mechanism to prevent the rotating shaft from coming off the housing. The come-off preventive mechanism is provided at the side of the housing 56 where the rotating shaft 51 projects. The bearing unit 90 has a shaft end receptacle 92 provided on the top portion 63 having the shaft insertion hole 65 in which the rotating shaft 51 is inserted and thus forming an oil seal.

The shaft end receptacle 92 is formed coupled integrally to the housing 56. The shaft end receptacle 92 has a shaft retainer 96 formed integrally on the top thereof and which has a through-hole 95 in which the rotating shaft 51 is inserted. The through-hole 95 is formed to have a diameter smaller than the diameter $R_1$ of the rotating shaft 51 received in the housing 56. The shaft retainer 96 is formed from a synthetic resin similarly to the housing 56 and thus elastically deformable.

On the other hand, there is formed in the outer end portion of the rotating shaft 51 where the fixing portion 52 is provided an engagement groove 97 into which the shaft retainer 96 is engaged when the rotating shaft 51 is introduced into the housing 56. When the rotating shaft 51 is inserted first at the bottom end portion 51a thereof into the housing 56 until the bottom end portion 51a abuts the thrust bearing 66, the shaft retainer 96 is engaged into the engagement groove 97 formed in the fixing portion 52 projected out of the housing 56. More particularly, the shaft retainer 96 is elastically deformed as the rotating shaft 51 is inserted into the through-hole 95. When the rotating shaft 51 is inserted until the bottom end portion 51a thereof is seated on the thrust bearing 66, the shaft retainer 96 is aligned with the engagement groove 97 whose diameter is smaller than the former. The shaft retainer 96 having been elastically deformed as above is elastically restored to its initial condition and engaged into the engagement groove 97. Since the shaft retainer 96 is thus engaged in the engagement groove 97, the rotating shaft 51 is limited from moving in the direction of arrow $X_1$ in FIG. 20 and thus prevented from coming off the housing 56.

In this embodiment, the synthetic resin-made shaft end receptacle 92 made of a synthetic resin can be formed by out-sert molding on the synthetic resin-made housing 56 Also, the shaft end receptacle 92 may be joined by thermal or ultrasonic welding to the synthetic resin-made housing 56.

Note here that the bearing unit according to the present invention and motor using the bearing unit can be used as the drive unit in a computer radiator previously described and also as a spindle motor that drives to rotate a hard disc used as a recording medium in a disc drive unit.

A disc drive unit using a motor that uses the bearing unit according to the present invention will be described hereinbelow:

The disc drive unit is a one installed in a PC card slot of a notebook-sized personal computer. It is designed very small and thin.

Figure 21:
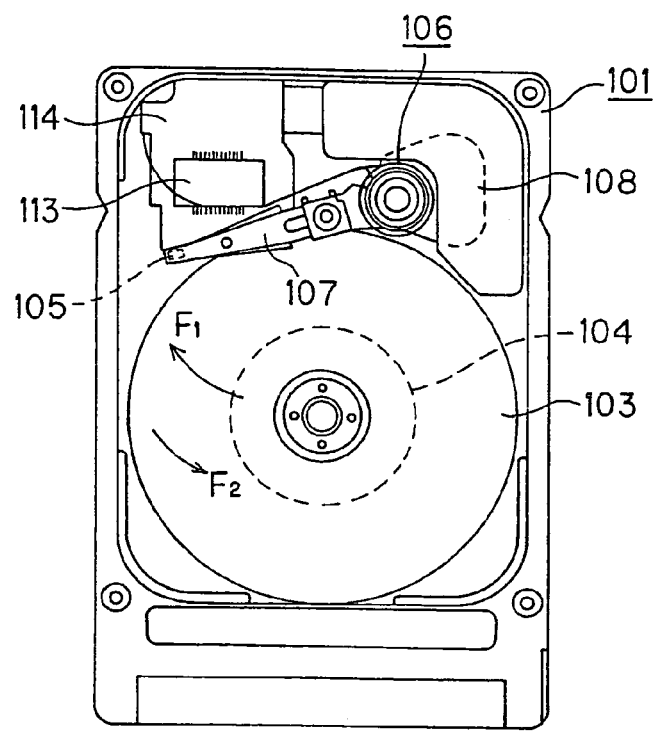
FIG. 21 is a plan view of a disc drive unit as an example of an information recorder/player, including the motor using the bearing unit according to the present invention.
Figure 22:
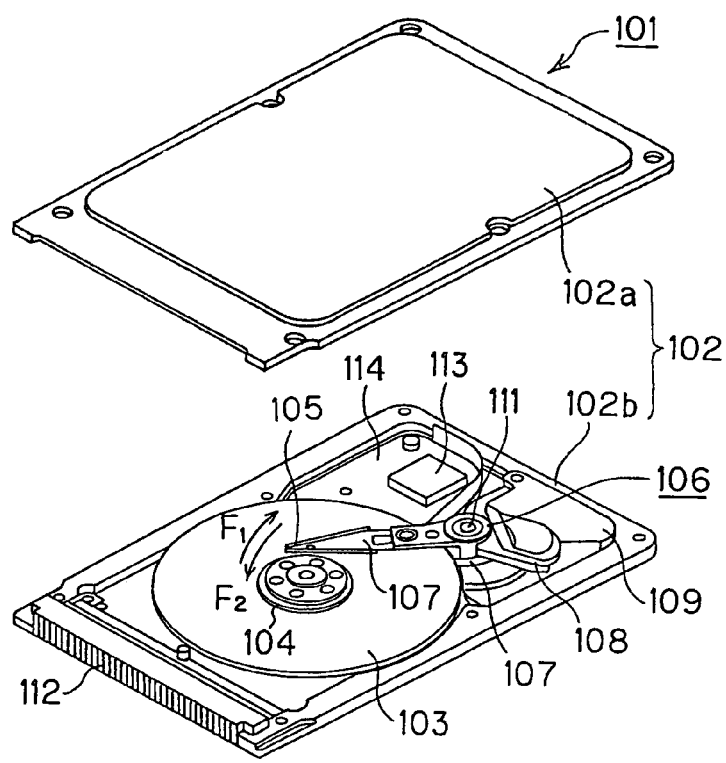
FIG. 22 is an exploded perspective view of the disc drive unit in FIG. 21, showing its internal mechanism.
Figure 23:
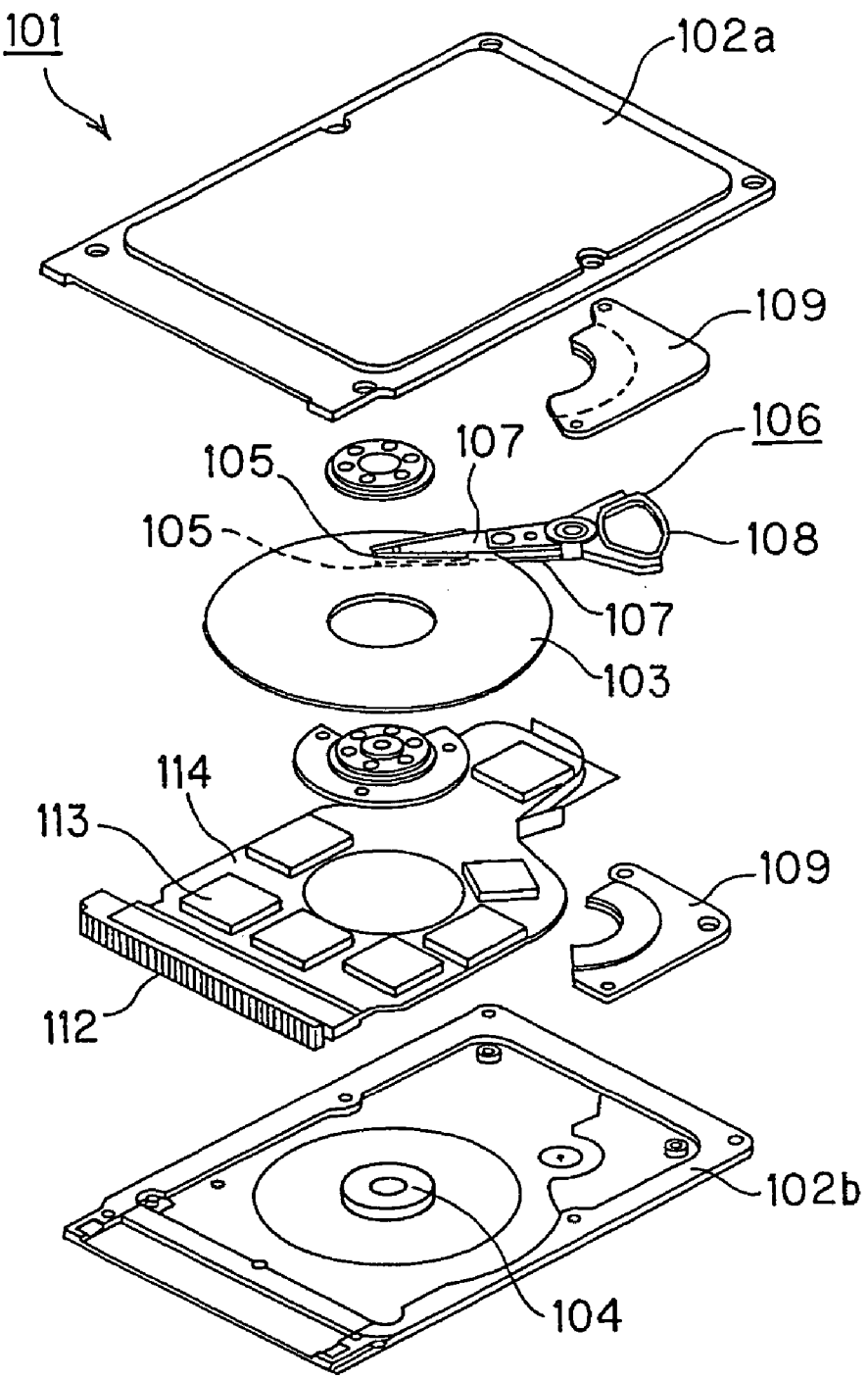
FIG. 23 is a further exploded perspective view of the disc drive unit in FIG. 21.

FIGS. 21 to 23 show together the disc drive unit in which the motor according to the present invention is used. The disc drive unit is generally indicated with a reference 101. As shown, the disc drive unit 101 includes a casing 102 as the main body, a hard disc 103 being a magnetic recording medium disposed in the casing 102, a spindle motor 104 using the bearing unit according to the present invention and which drives to rotate the hard disc 103, magnetic heads 105 which scan the signal recording area of the hard disc 103 being rotated by the spindle motor 104 to write or read information signals to or from the hard disc 103, and a rotating actuator 106 to support the magnetic heads 105.

The casing 102 is formed from a pair of casing halves 102a and 102b, upper and lower, by joining them end to end.

Figure 24:
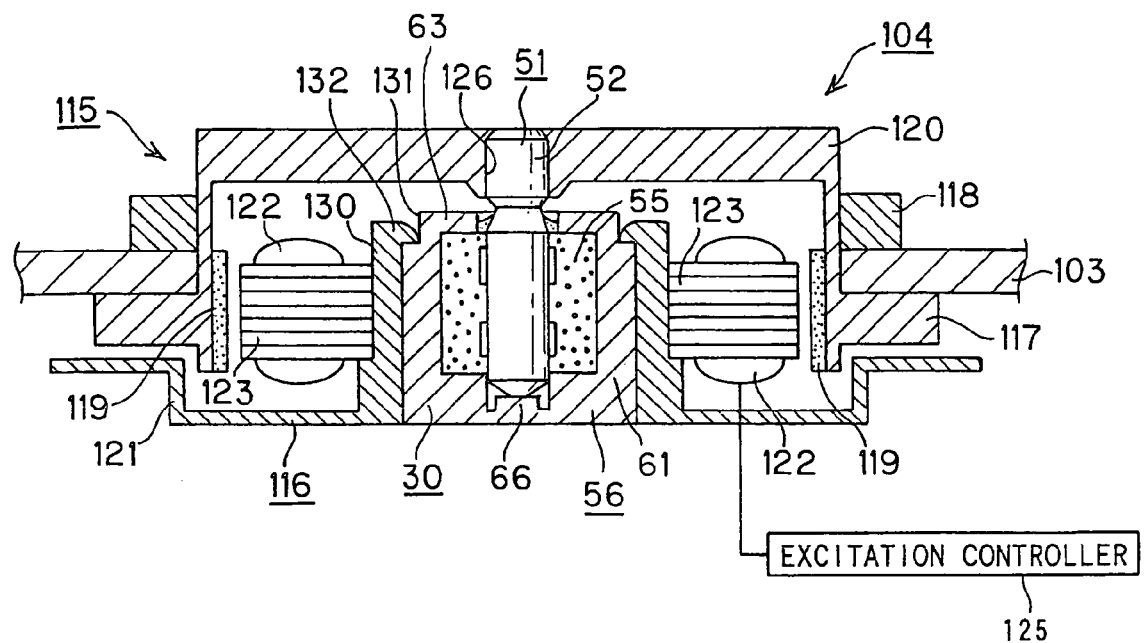
FIG. 24 is a sectional view of a spindle motor according to the present invention, having the bearing unit positioned and installed to a stator thereof.

The hard disc 103 is fixed to a rotor 115 of the spindle motor 104 as shown in FIG. 24, and rotates along with the rotor 115.

The rotating actuator 106 supporting the magnetic heads 105 which scan the hard disc 103, includes a pair of head support arms 107 extending over each side of the hard disc 103, and a voice coil 108. The voice coil 108 is provided between a pair of magnets 109 disposed inside the casing 102 as shown in FIG. 23. The voice coil 108 and magnets 109 form together a voice coil motor. When the rotating actuator 106 is supplied at the voice coil 108 thereof with an exciting current, a magnetic field developed around the voice coil 108 and magnetic fields developed around the pair of magnets 109 act on each other to produce an electromagnetic force with which the head support arms 107 are rotated about a pivot 111 in the directions of arrows F1 and F2 shown in FIGS. 21 and 22. As the head support arms 107 are rotated by the voice coil motor, the magnetic heads 105 supported by the head support arms 107, respectively, are positioned on an arbitrary recording track on the hard disc 103 being rotated and write an information signal to the hard disc 103 or read an information signal already recorded in the hard disc 103. It should be noted that each of the magnetic heads 105 is one using a magneto-resistive element.

Note that the disc drive unit 101 is provided at one end of the casing 102 with a connection terminal 112 which provides an electrical connection to a computer or the like. Inside the casing 102, there are provided a system LSI (large-scale integrated circuit) 113 and a circuit board 114 having mounted thereon ordinary electronic parts such as IC (integrated circuit), etc.

The spindle motor 104 to rotate the hard disc 103 is provided with a rotor 115 and stator 116.

The rotor 115 includes a rotor housing 120 having formed thereon a turntable 117 on which the hard disc 103 is mounted, a chucking member 118 working with the turntable 117 to clamp the hard disc 103, and a rotor magnet 119.

Note that the rotor 115 has the rotor housing 120 thereof supported rotatably by the bearing unit 30 according to the present invention, having been described in the foregoing. Since the basic construction of the bearing unit 30 used in the spindle motor 104 is as has been described in the foregoing, it will not be described in detail any longer.

The rotor housing 120 is formed from a magnetic material, such as iron, and has a fitting hole 126 formed in the center thereof. The rotor housing 120 is press-fitted at the fitting hole 126 thereof on the fixing portion 52 of the rotating shaft 51. Thus, the rotor housing 120 is rotated along with the rotating shaft 51 of the bearing unit 30.

As shown in FIG. 24, the turntable 117 is formed protruded from the perimeter of the rotor housing 120. It receives the hard disc 103. The hard disc 103 is supported at the inner circumferential portion thereof by the turntable 117 and chucking member 118 forced to the turntable 117 to be rotatable along with the rotor housing 120. It should be noted that the chucking member 118 is formed like a ring from a stainless steel, for example.

The rotor magnet 119 provided on the cylindrical inner surface of the rotor housing 120 is formed like a ring and alternately magnetized as N and S poles circumferentially. The rotor magnet 119 is formed from a sintered neodymium-iron-boron (Nd—Fe—B), for example.

The stator 116 included together with the rotor 115 in the spindle motor 104 includes a stator housing 121, a housing 56 of the bearing unit 30, an excitation coil 122, an iron core 123 on which the excitation coil 122 is wound, and a flexible printed wiring board (not shown) having mounted thereon a drive circuit to control the rotation of the spindle motor 104, etc.

The stator housing 121 is made of a stainless steel, for example, and has the flexible printed wiring board fixed thereto by bonding. The flexible printed wiring board is electrically connected to the excitation coil 122. The excitation coil 122 has U-, V- and W-phase terminals and a common terminal thereof led out of the stator housing 121 via the flexible printed wiring board. The flexible printed wiring board is electrically connected to an excitation controller 125 via a connector.

The iron core 123 having the excitation coil 122 wound thereon has nine poles, for example. On the other hand, the rotor magnet 119 has, for example, twelve poles, including the N and S poles, formed circumferentially. When the excitation coil 122 is supplied with an exciting current in a predetermined pattern of excitation from the excitation controller 125, a magnetic field developed around the excitation coil 122 thus excited and magnetic fields developed around the rotor magnet 119 pair of magnets 109 act on each other to continuously rotate the rotor 115 about the rotating shaft 51 in relation to the stator 116.

The stator housing 121 has a cylindrical portion 130 formed to rise from it. The bearing unit 30 is inserted at the housing 56 thereof in the cylindrical portion 130. That is, the cylindrical portion 130 secures the bearing unit 30.

Figure 25:
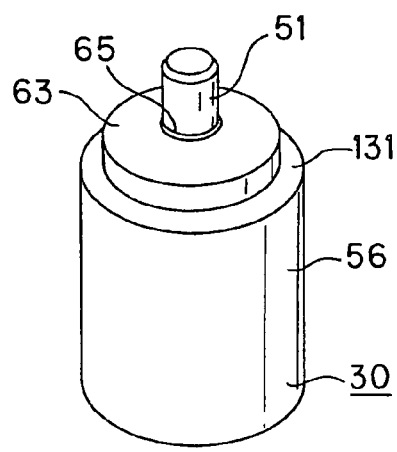
FIG. 25 is a perspective view of the bearing unit having an engagement portion formed thereon to help positioning and installing the bearing unit to the stator of the spindle motor in FIG. 24.

Note that the bearing unit 30 supports the rotor 115 at the top of the rotating shaft 51 thereof and is installed in the stator housing 121, whereby it forms a part of the spindle motor 104. The bearing unit 30 has to be positioned for accurate installation to the stator housing 121. For supporting the bearing unit 30 in the stator housing 121, the bearing unit 30 has a step 131 formed as an engagement means on the housing 56 thereof, as shown in FIGS. 24 and 25. The bearing unit 30 is engaged at the step 131 on the stator housing 121. The step 131 is formed on the outer surface of the housing 56 where there is provided the top portion 63 through which the rotating shaft 51 projects out.

Note that the cylindrical portion 130 of the stator housing 121 included in the stator 116 of the spindle motor 104 thus retains the synthetic resin-made housing 56 of the bearing unit 30.

With the bearing unit 30 having the step 131 as an engagement means formed on the housing 56 as above being inserted into the cylindrical portion 130 provided on the stator housing 121 made of a metal, such as a stainless steel, the cylindrical portion 130 is riveted at the top thereof (indicated at a reference 132) to engage on the step 131, whereby the rotating shaft 51 is positively secured in the stator housing 121. By thus forming the to-be-riveted portion 132 at the cylindrical portion 130 in which the housing 56 of the bearing unit 30 is inserted, it is possible to install the bearing unit 30 in place to a motor, such as the spindle motor, without applying any large load to the bearing unit 30.

The synthetic resin, such as polyimide, polyamide or nylon, used to form the housing 56 of the bearing unit 30, cannot satisfactorily be bonded to a metal as the case may be. Since the housing 56 of the bearing unit 30 is formed from a synthetic resin while the cylindrical portion 130 of the housing 121 is formed from a metal, they have to be fixed to each other mechanically. In this embodiment, the synthetic resin-made housing 56 of the bearing unit 30 is retained by riveting the to-be-riveted portion 132 of the cylindrical portion 130 of the metal-made stator housing 121. Namely, the synthetic resin-made housing 56 and metallic cylindrical portion 130 can mechanically be fixed to each other positively.

Figure 26:
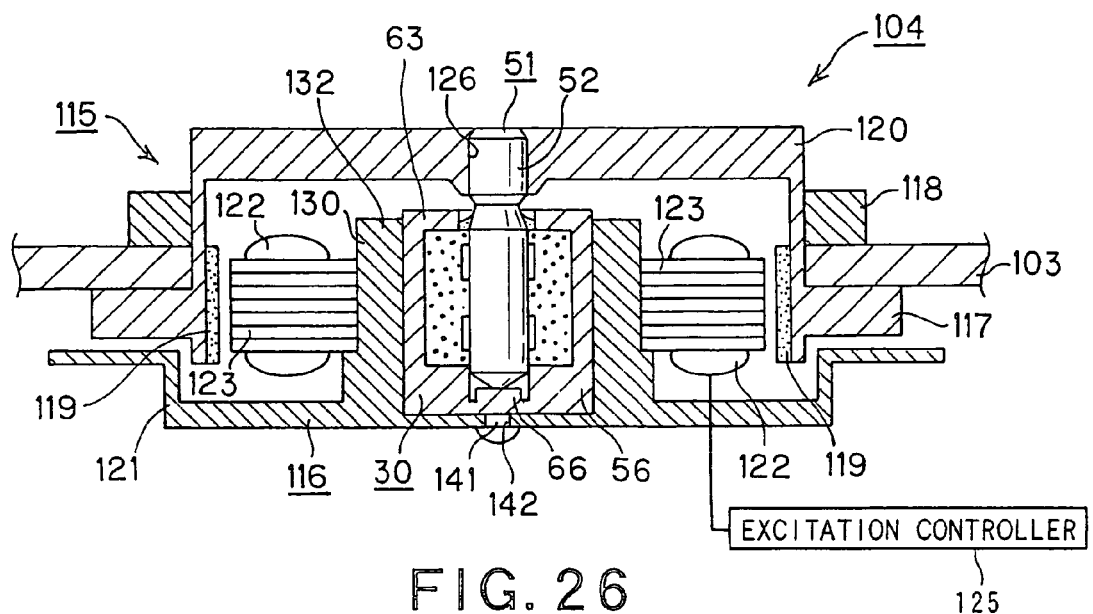
FIG. 26 is a sectional view of a variant of the spindle motor to which the bearing unit is positioned and installed.

Next, a variant of the spindle motor 104 having the bearing unit 30 installed in the stator housing 121 will be described with reference to FIGS. 26 and 27.

In this spindle motor 104, the bearing unit 30 is fixed to the stator housing 121 by thermal riveting, not by riveting the cylindrical portion 130.

In this variant, the bearing unit 30 fixed to the stator housing 121 has a projection 141 formed on the bottom portion 62 of the housing 56 where the thrust bearing 66 is formed. The projection 141 is formed integrally with the housing 56 formed from a synthetic resin. Namely, the projection 141 is also formed from the synthetic resin. In this bearing unit 30, the projection 141 is inserted in a through-hole 142 formed in the bottom of the cylindrical portion 130 and thermally deformed (riveted) at the free end thereof projected out of the through-hole 142. By thermally deforming the free end of the projection 141, the bearing unit 30 is secured to the stator housing 121.

Figure 27:
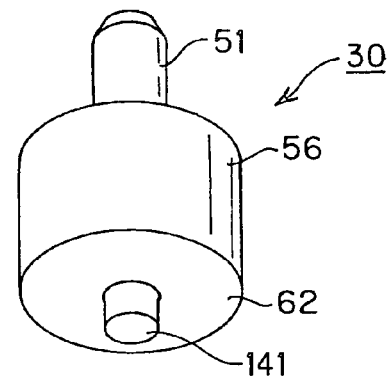
FIG. 27 is a perspective view of the bearing unit having a positioning projection provided on the bottom of the housing.
Figure 28:
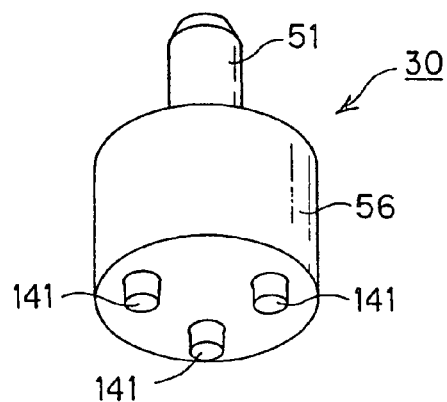
FIG. 28 is a perspective view of another variant of the bearing unit according to the present invention, having positioning projections provided on the bottom of the housing.

FIG. 27 shows the bearing unit 30 in which there is provided only one projection 141 to secure the bearing unit 30 to the stator housing 121. It should be noted, however, that a plurality of projections 141 may be provided as shown in FIG. 28. Also, in this bearing unit 30, the projections 141 are inserted in through-holes 142, respectively, formed in the bottom of the stator housing 121, and thermally deformed at the free ends thereof to secure the bearing unit 30 to the stator housing 121.

Figure 29:
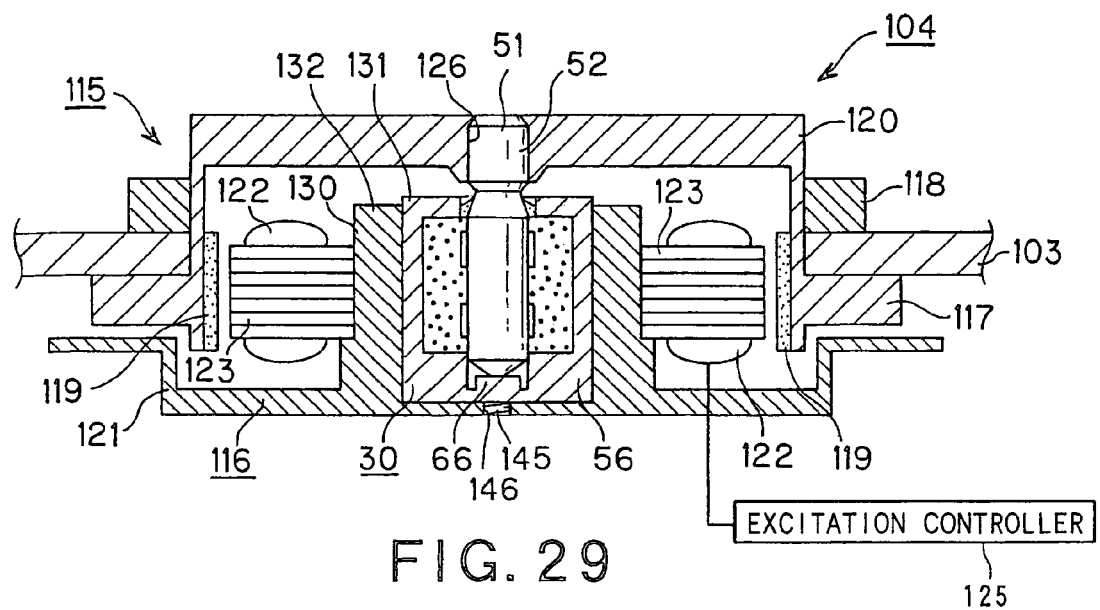
FIG. 29 is a sectional view of another variant of the spindle motor according to the present invention, to which the bearing unit is positioned and installed.

Next, another variant of the spindle motor 104 having the bearing unit 30 installed in the stator housing 121 will be described with reference to FIGS. 29 and 30.

The bearing unit 30 fixed to the stator housing 121 of this spindle motor 104 has an externally threaded projection 145 formed like the above-mentioned projection on the bottom portion 62 of the housing 56 thereof. On the other hand, the stator housing 121 has formed in the bottom of the cylindrical portion 130 thereof a screw hole 146 into which the threaded projection 145 is driven. By driving the threaded projection 145 into the screw hole 146 with the bearing unit 30 being received in the cylindrical portion 130, the bearing unit 30 is accurately positioned and installed in place to the stator housing 121.

Figure 30:
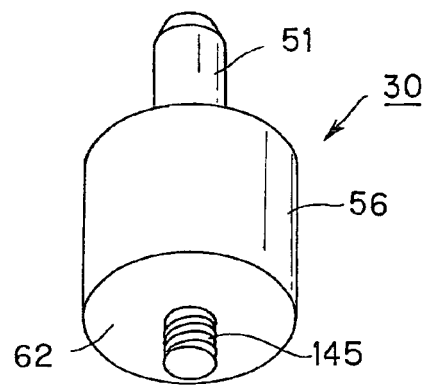
FIG. 30 is a perspective view of the bearing unit having an externally threaded projection provided on the bottom of the housing.
Figure 31:
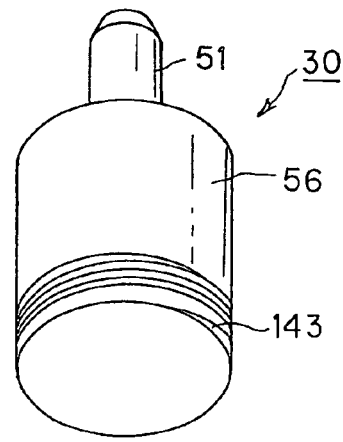
FIG. 31 is a perspective view of the bearing unit including a housing having an externally threaded portion on the outer surface thereof near the bottom.

Note that the externally threaded projection 145 for fixing the bearing unit 30 to the stator housing 121 is formed as an projection, as shown in FIG. 30; but, it may be formed as an external thread 143 on the outer surface of the housing 56 at a portion near the bottom portion 62 as shown in FIG. 31. In this latter case, the screw hole formed at the stator housing 121 is formed as one equal in diameter to the housing 56.

Figure 32:
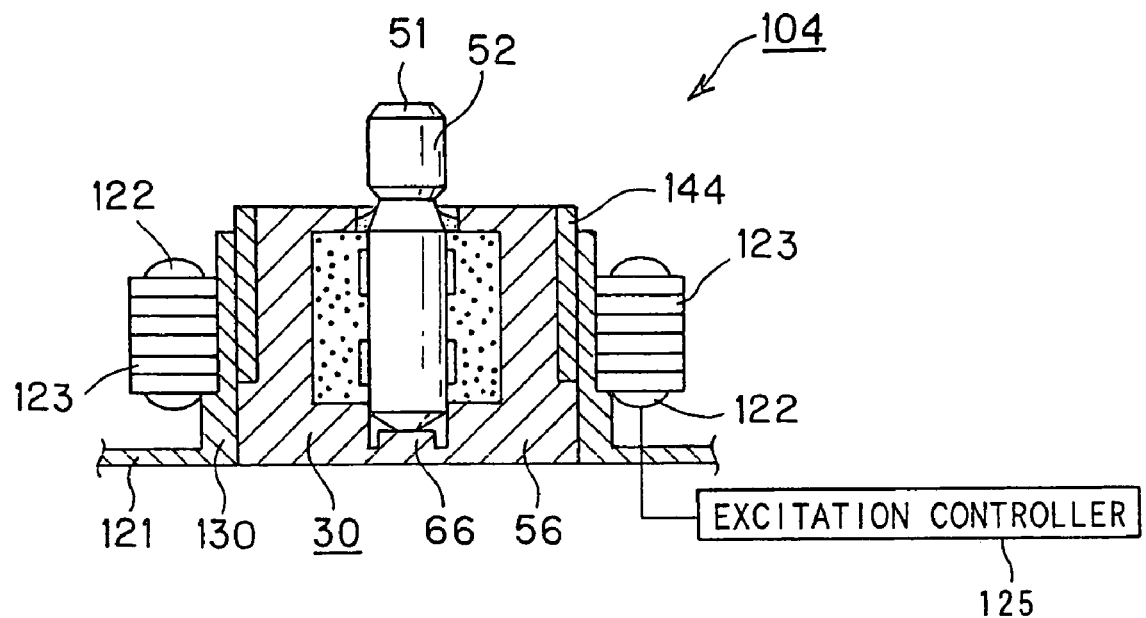
FIG. 32 is a sectional view of still another variant of the spindle motor according to the present invention, having the bearing unit fixed by bonding in a cylindrical portion of a stator housing thereof.

According to the present invention, the spindle motor 104 may be constructed as shown in FIG. 32. More specifically, in the spindle motor 104, the bearing unit 30 has a metallic annular member 144 press-fitted on the outer surface of the synthetic resin-made housing 56 thereof. With the metallic annular member 144 and housing 56 being inserted in the cylindrical portion 130 of the metallic stator housing 121, the outer surface of the metallic annular member 144 and inner surface of the metallic cylindrical portion 130 are bonded to each other with an adhesive. By installing the bearing unit 30 to the stator housing 121 in this manner, the bearing unit 30 can be secured positively to the cylindrical portion 130 of the stator housing 121.

According to the present invention, the bearing unit 30 used in the aforementioned spindle motor 104 may be constructed as will be described below with reference to FIGS. 33 to 36.

Figure 33:
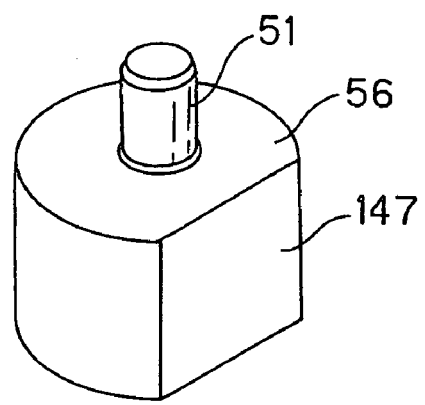
FIG. 33 is a perspective view of the bearing unit having a detent provided on the housing.
Figure 34:
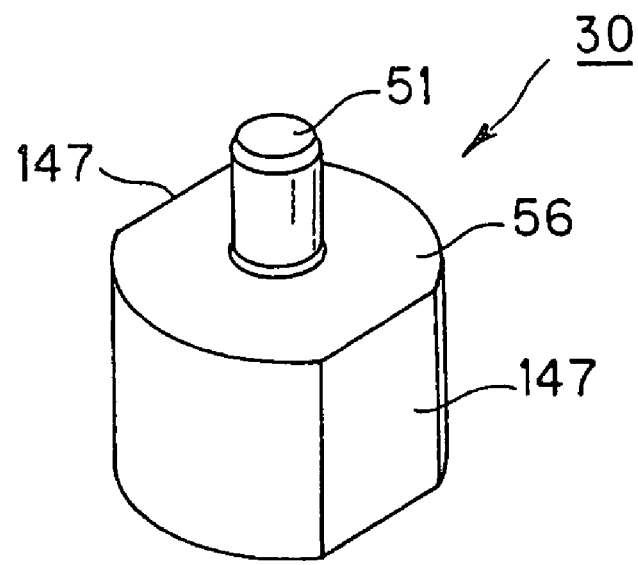
FIG. 34 is a perspective view of another variant of the bearing unit having detents provided on the housing.
Figure 35:
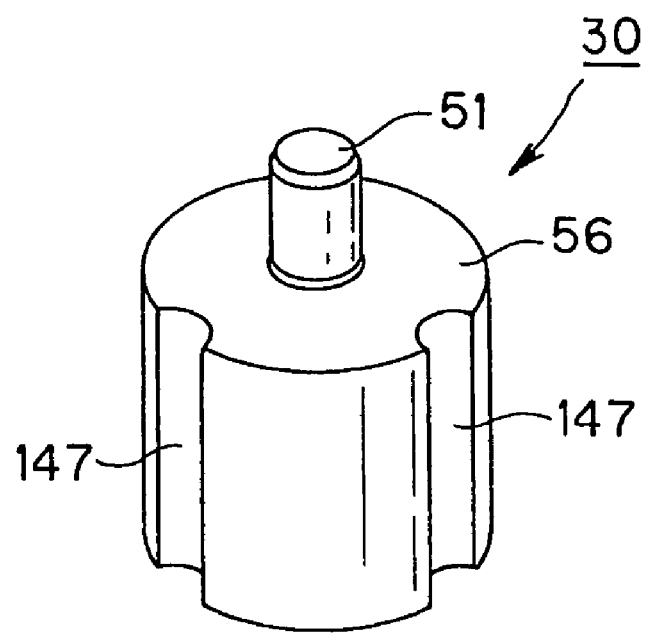
FIG. 35 is a perspective view of still another variant of the bearing unit having detents provided on the housing.
Figure 36:
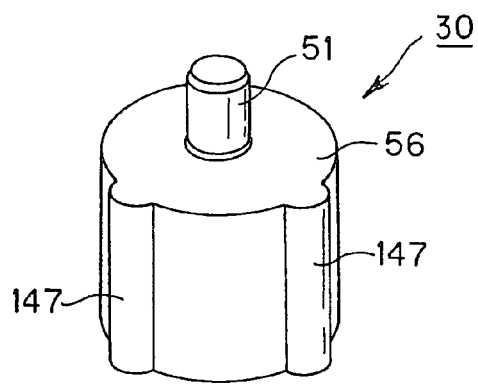
FIG. 36 is a perspective view of yet another variant of the bearing unit having detents provided on the housing.

Each of the bearing units 30 shown in FIGS. 33 to 36 has a detent 147 formed on the housing 56 thereof. The detent 147 of the bearing unit 30 shown in FIG. 33 is a flat surface formed by flattening the lateral side of the housing 56. The detents 147 of the bearing unit 30 shown in FIG. 34 are a pair of opposite flat surfaces formed by flattening the lateral side of the housing 56. The detents 147 of the bearing unit 30 shown in FIG. 35 are a plurality of recesses formed in the outer surface of the housing 56 to extend axially of the bearing unit 30 and along the height of the housing 56 and each have a semicircular section. The detents 147 of the bearing unit 30 shown in FIG. 36 are a plurality of ribs formed on the outer surface of the housing 56 to extend axially of the bearing unit 30 and along the height of the housing 56 and each have a semicircular section.

By forming the inner surface of the cylindrical portion 130 of the stator housing 121 correspondingly to the detent or detents 147 on the outer surface of the housing 56 shown in FIGS. 33 to 36, it is possible to block the bearing unit 30 from being rotated when the bearing unit 30 is introduced into the cylindrical portion 130 of the stator housing 121.

Figure 37:
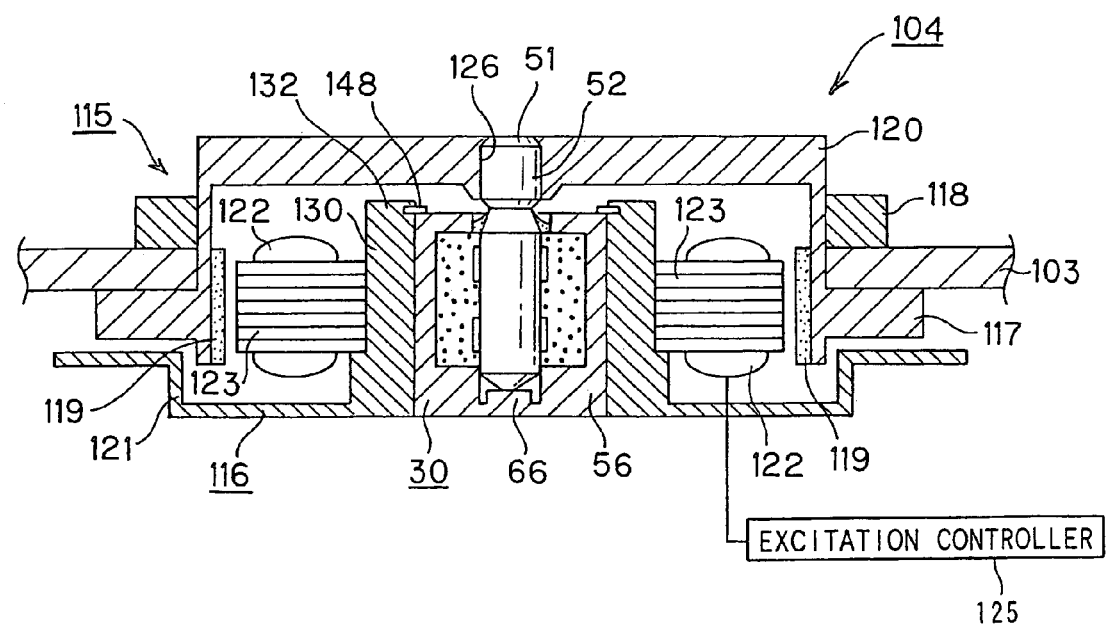
FIG. 37 is a sectional view of yet another variant of the spindle motor according to the present invention, having the bearing unit positioned and installed to a stator housing thereof.

Further, according to the present invention, the spindle motor 104 may be constructed as shown in FIG. 37. The spindle motor 104 has a C-shaped metallic retention member 148 formed at the top of the cylindrical portion 130 of the state housing 121, as shown in FIG. 37. The C-shaped metal retention member 148 can be used to fix the housing 56 of the bearing unit 30 against axially coming out of the cylindrical portion 130 of the stator housing 121.

Figure 38:
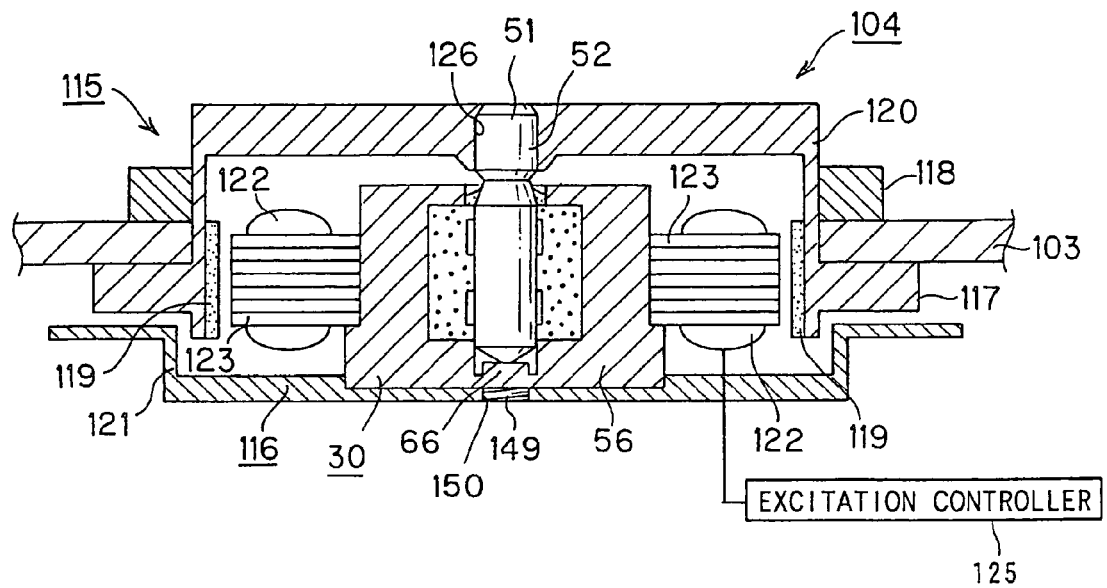
FIG. 38 is a sectional view of a spindle motor according to the present invention, in which the housing of the bearing unit is used as a part of the stator.

Moreover, according to the present invention, the spindle motor 104 may be constructed as shown in FIG. 38. The spindle motor 104 has the iron core 123, having the excitation coil 122 wound thereon, installed directly to the outer surface of the housing 56 included in the bearing unit 30, as shown in FIG. 38. Thus, the cylindrical portion 130 included in the aforementioned spindle motors 104 to install the excitation coil 122 to the stator housing 121 is unnecessary, and thus the stator housing 121 is constructed simpler, which will lead to a reduced manufacturing cost. In this case, the housing 56 of the bearing unit 30 may be fixed to the stator housing by either press-fitting or bonding. Alternately, the housing 56 of the bearing unit 30 may have an externally threaded projection 149 formed on the bottom thereof, and the threaded projection 149 may be driven into a screw hole 150 formed in the stator housing 121 to fix the housing 56 to the stator housing 121.

Figure 39:
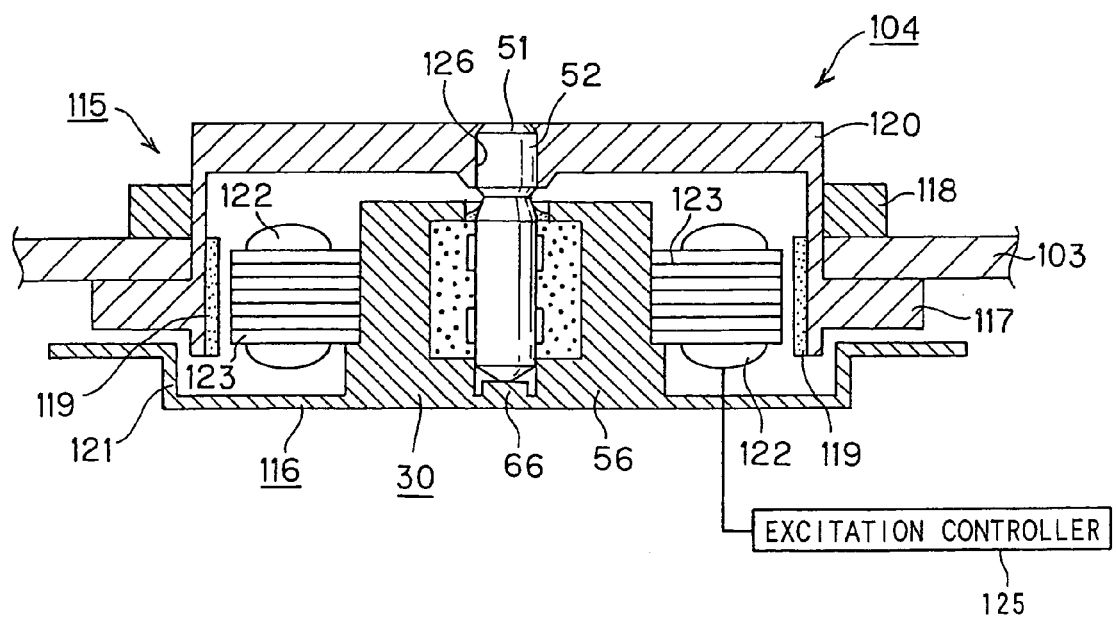
FIG. 39 is a sectional view of a spindle motor according to the present invention, whose stator housing is used to form the housing of the bearing unit.

Furthermore, according to the present invention, the spindle motor 104 may be constructed as shown in FIG. 39. In this spindle motor 104, the housing 56 of the bearing unit 30 and the stator housing 121 are formed integrally with each other from a synthetic resin as shown in FIG. 39. Thus, the spindle motor 104 can be formed from a reduced number of parts, which also will lead to a reduced manufacturing cost.

Figure 40:
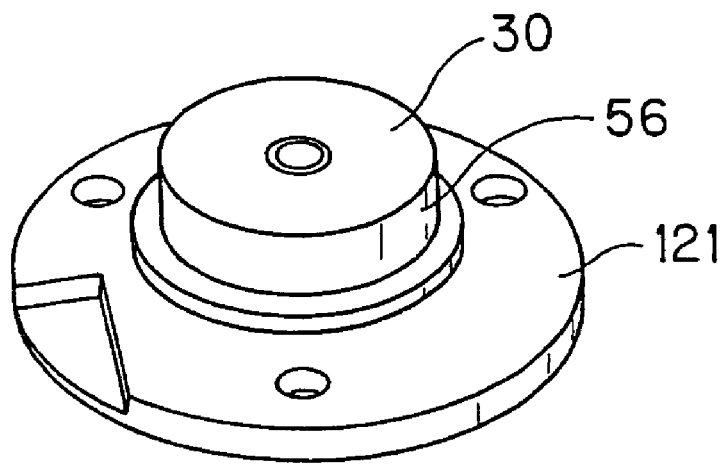
FIG. 40 is a perspective view of a variant of the bearing unit in which the housing of the bearing unit is formed from a synthetic resin integrally with the stator housing of the spindle motor.
Figure 41:
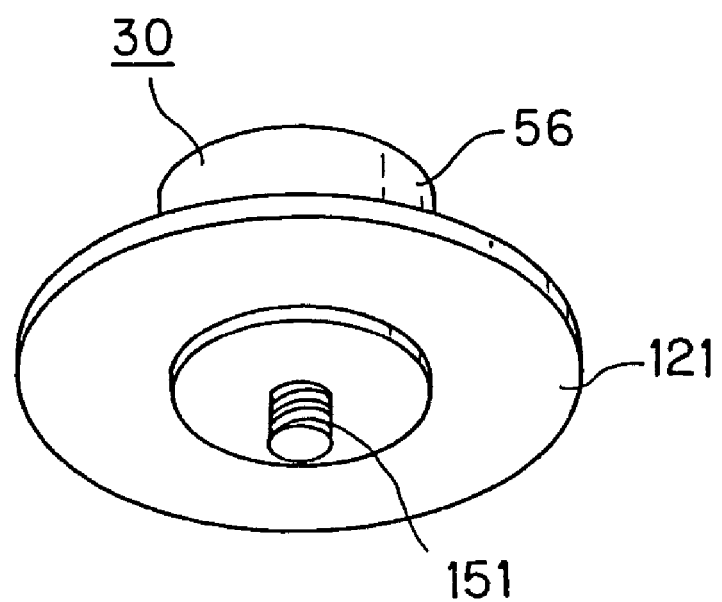
FIG. 41 is a perspective view of a variant of the bearing unit, in which the housing of the bearing unit formed integrally with the stator housing of the spindle motor has an externally threaded projection provided on the bottom thereof.

Also, according to the present invention, both the housing 56 of the bearing unit 30 and stator housing 121 may be formed integrally with each other from a synthetic resin, as shown in FIG. 40. Alternately, an externally threaded projection 151 of course can be formed integrally on the bottom of the synthetic resin-made housing 56, as shown in FIG. 41.

By forming the housing 56 of the bearing unit 30 and the stator housing 121 integrally with each other from a synthetic resin as above, it is possible to reduce the necessary number of parts of the spindle motor 104, make the assembling process for each part unnecessary and manufacture the spindle motor more easily.

The bearing unit used in the aforementioned spindle motor supports the rotating shaft rotatably in relation to the housing. According to the present invention, however, the housing may be adapted to be rotatable in relation to the shaft of the bearing unit.

An example of the spindle motor using a bearing unit whose shaft is fixed will be illustrated and explained hereinbelow.

Note that in the following illustration and explanation, the same or similar elements of these bearing unit and spindle motor as those of the bearing units 30 and the spindle motors 104 using the bearing unit 30 will be indicated with the same or similar references as those used in the illustration and explanation of the bearing units 30 and spindle motors 104 and will not be explained in detail any longer.

Figure 42:
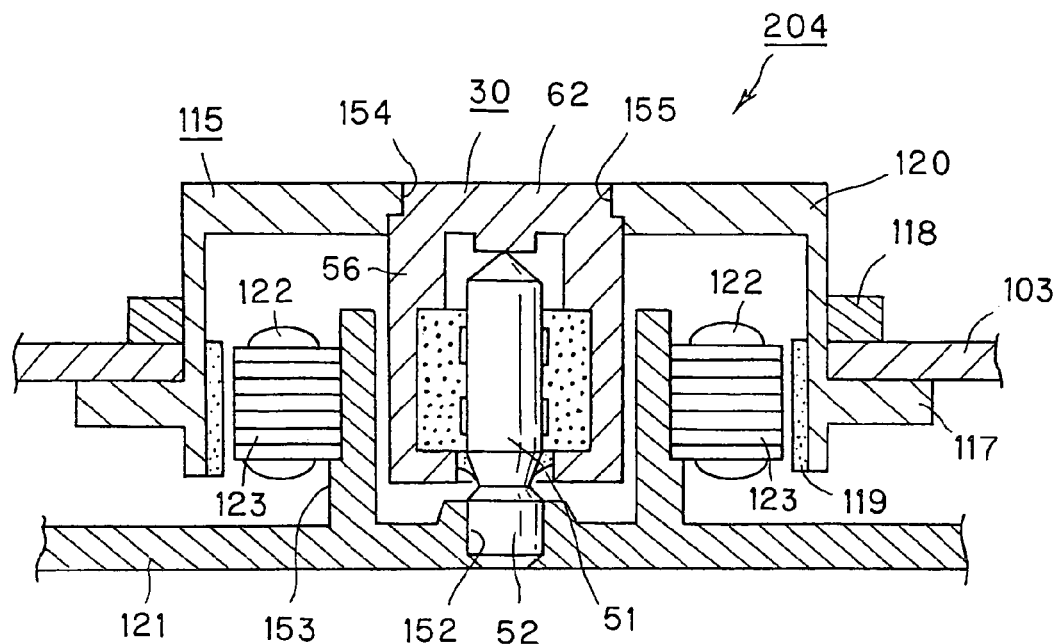
FIG. 42 is a sectional view of another variant of the spindle motor according to the present invention.

The spindle motor in which the shaft of the bearing unit is fixed is generally indicated with a reference 204 in FIG. 42. As shown, in the spindle motor 204, the shaft 51 of the bearing 30 is fixed to the stator housing 121. The shaft 51 is press-fitted at the fixing portion 52 thereof projecting out of the housing 56 into a fixing hole 152 formed in the stator housing 121, and fixed to the stator housing 121. With the shaft 51 being thus fixed in the bearing unit 30, the housing 56 is supported rotatably in relation to the shaft 51.

The stator housing 121 having the shaft 51 fixed thereto has a cylindrical coil fixture 153 formed to enclose the housing 56 of the bearing unit 30. Around the coil fixture 153, there is installed the iron core 123 having the excitation coil 122 wound thereon.

According to this variant, the spindle motor 204 has the rotor 115 thereof installed to the housing 56 supported rotatably in relation to the shaft 51. The rotor housing 120 has an engagement hole 14 formed in the center thereof, and the bearing unit 30 has an engagement portion 155 formed on the outer surface of the bottom portion 62 of the housing 56 thereof. With the engagement portion 155 being press-fitted in the engagement hole 154, the rotor 115 is installed integrally with the housing 56 to be rotatable.

Note that the engagement hole 154 is stepped at the inner surface thereof and the engagement portion 155 is correspondingly stepped at the outer surface thereof to position the rotor 115 in relation to the housing 56 to which the rotor 115 is to be fixed.

Also, in the spindle motor 204, the rotor magnet 119 is disposed on the inner surface of the cylindrical portion of the rotor housing 120 oppositely to the excitation coil 122 on the stator 116. The rotor housing 120 has formed on the outer surface thereof the turntable 117 on which the hard disc 103 is to be placed. The hard disc 103 also is supported at the inner circumference thereof between the turntable 117 and chucking member 118 pressed toward the turntable 117 to be rotatable along with the rotor housing 120.

According to the present invention, the bearing unit may be designed such that the shaft is rotatable or the housing is rotatable with the shaft being fixed. That is to say, either of such designs of the bearing unit according to the present invention may appropriately be selected depending upon how a motor or the like using the bearing unit is constructed.

Note that in the bearing unit according to the present invention, if the housing to support the metallic shaft is formed from a synthetic resin that is electrically insulative, the static electricity charged on the shaft being rotated cannot be discharged surely to outside the bearing unit.

If such a bearing unit from which the static electricity charged on the rotating shaft cannot be discharged to outside is used in a disc drive unit, there will arise the following problems.

Since there is not provided any discharge means or path from the shaft being a rotating part of the bearing unit, the hard disc installed on the shaft will be charged with static electricity. For example, the magneto-resistive head to scan a hard disc and write or read information signals to or from it has a withstand voltage as low as 100 V or so, and thus will possibly be damaged by static electricity.

On this account, when the bearing unit according to the present invention is used in a disc drive unit or the like which writes or reads information signal to or from a disc therein and from which any small influence of static electricity has to be removed, it should desirably be constructed to discharge static electricity developed on the rotating part surely to outside.

Next, a bearing unit from which static electricity developed due to the rotation of the shaft can be discharged to outside and a spindle motor using the bearing unit will be described.

Note that in the following illustration and explanation, the same or similar elements of the bearing unit 30 and spindle motor 104 as those of the aforementioned bearing units and spindle motors will be indicated with the same or similar references as those used in the illustration and explanation of the bearing units and spindle motors and will not be described in detail any longer.

The spindle motor is generally indicated with a reference 104. It employs a bearing unit generally indicated with a reference 160 from which static electricity developed due to the rotation of the rotating shaft 51 can be discharged to outside the housing 56. The spindle motor 104 is used in a disc drive unit like the spindle motor previously described with reference to FIG. 24.

Figure 43:
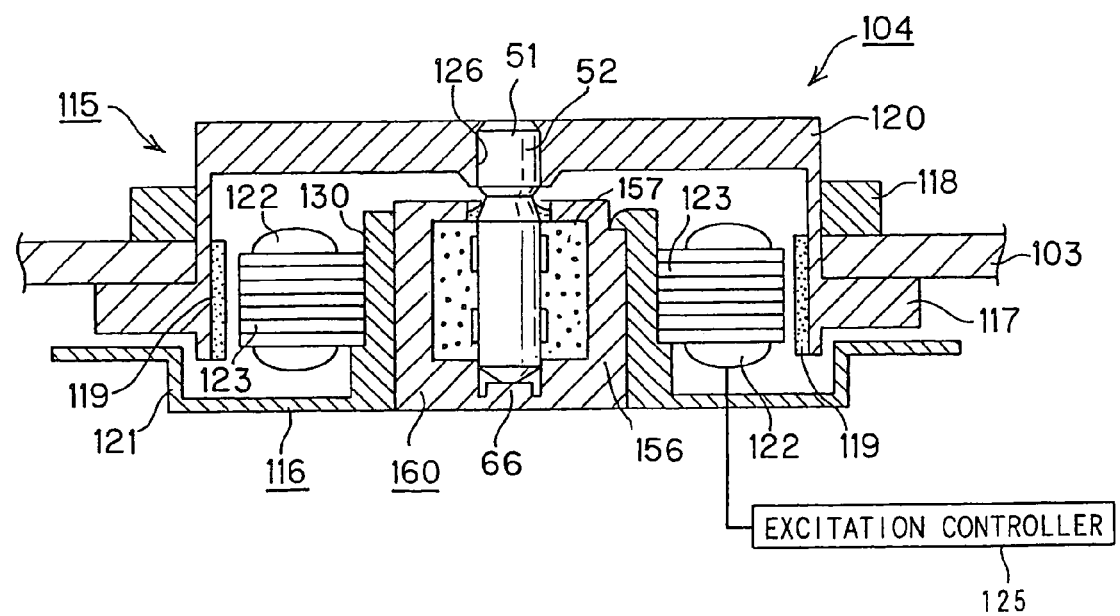
FIG. 43 is a sectional view of a spindle motor according to the present invention, using a bearing unit provided with a static electricity discharging function.
Figure 44:
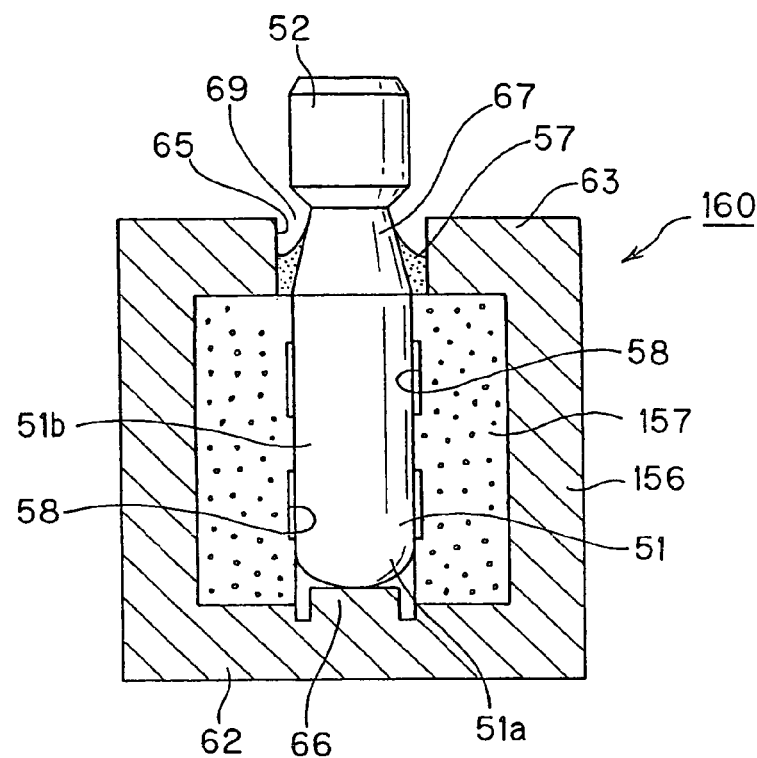
FIG. 44 is a sectional view of a fifth embodiment of the bearing unit according to the present invention, provided with a static electricity discharging function.

The spindle motor 104 shown in FIG. 43 uses the bearing unit 160 including a housing 156 formed from an electroconductive resin having a electroconductive material mixed therein and which is constructed as shown in FIG. 44, which shows a fifth embodiment of the bearing unit according to the present invention. The electroconductive resin is a polycarbonate, polyester, nylon, polyimide, liquid crystal or the like in which conductive carbon or metal powder is mixed. Also, a synthetic resin having electroconductive carbon nanotube mixed therein so as to be moldable with a high precision is used.

An electroconductive lubricant 157 is filled in the housing 156 formed from such an electroconductive resin. The lubricant 157 may be a machine oil such as esters, diesters, polyalphaolefin (PAO) or fluorinated machine oil in which an electroconductive material such as an electroconductive carbon compound is mixed.

The radial bearing 55 received in the housing 156 is formed from the above-mentioned electroconductive metal as sintered, brass or stainless steel.

Further, the rotating shaft 51 received in the housing 156 is formed from an electroconductive metal such as stainless steel.

The bearing unit 160 formed from the above-mentioned material has a discharge path from the rotating shaft 51 through the electroconductive lubricant 157 filled in the electroconductive housing 156 and radial bearing 55 to the housing 156 itself. That is, the bearing unit 160 can discharge static electricity developed when the rotating shaft 51 rotates inside the housing 156 along the discharge path to outside the housing 156.

In the spindle motor 104 using the bearing unit 160 having such a discharge path, static electricity developed due to the rotation of the rotating shaft 51 can be discharged to the cylindrical portion 130 formed integrally with the metallic stator housing 121 included in the stator 116, as shown in FIG. 43. Since in the spindle motor 104 using the bearing unit 160 according to the present invention, the static electricity developed when the rotating shaft 51 rotates can be discharged to the stator housing 121, it is possible to prevent the static electricity from being charged to the hard disc 103 through the turntable 117. Thus, the magnetic head for writing or reading information signals can be protected against damage since it can be prevented from having the static electricity discharged thereto.

Figure 45:
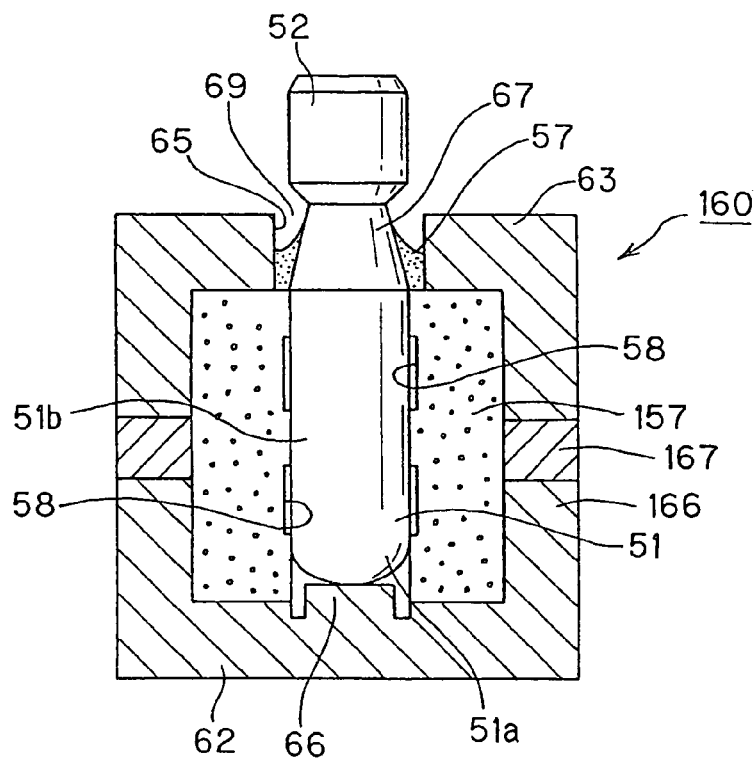
FIG. 45 is a sectional view of a variant of the fifth embodiment of bearing unit in FIG. 44, provided with a static electricity discharging function.

To define the discharge path from the rotating shaft of the bearing unit to the stator housing of the spindle motor, the bearing unit may be constructed, as shown in FIG. 45, showing a variant of the fifth embodiment of the bearing unit. As shown, the bearing unit 160 includes a housing 166 formed from a synthetic resin which is electrically insulative, such as polyimide, polyamide, polyacetal or the like, and which has buried therein a metallic discharge member 167 extending between the inner surface and outer surface of the housing 166. The metallic discharge member 167 is formed toroidally, for example, and provided integrally in the housing 166 when the latter is formed by out-sert molding. The metallic discharge member 167 is formed from an electroconductive metal such as brass, stainless steel, or a sintered metal. The metal discharge member 167 is in contact with the outer surface of the radial bearing 55 in the housing 166.

In the spindle motor 104 using the bearing unit 160 constructed as above, static electricity developed when the rotating shafts 51 rotate can be discharged to the stator housing 121 as in the spindle motor 104 shown in FIG. 43.

Using the bearing unit according to the present invention as in the foregoing, it is possible to positively protect parts included in a disc drive unit, such as the magnetic head and others, against being influenced by the static electricity.

Further, since the bearing unit according to the present invention is constructed to prevent the lubricant filled in the housing from leaking out, the magnetic head and hard disc inside a disc drive unit can be prevented from being defaced with the lubricant. Thus, a disc drive unit can be constructed which can write or read information signals safely with a positive protection of the magnetic head and hard disc.

In the aforementioned bearing unit, the thrust bearing supporting the shaft in the direction of thrusting is formed as a pivot bearing which supports the shaft at one end of the latter, which is formed circular or tapered. According to the present invention, however, the bearing unit is not limited to a one using the pivot bearing but may be a one in which the shaft is supported at the one end thereof which is a flat surface, not circular or tapered.

A bearing unit using a thrust bearing which supports the one end of the shaft in the direction of thrusting on a flat surface will be described below with reference to FIGS. 46 and 47.

Note that in the following explanation, the same or similar elements of this bearing unit as those of the aforementioned bearing units are indicated with the same or similar references as those used in the illustration and explanation of the bearing units and will not be described in detail any longer.

This bearing unit is generally indicated with a reference 230. As shown in FIG. 46 showing the sixth embodiment of the bearing unit according to the present invention, the bearing unit 230 has the rotating shaft 51 whose one end portion is formed to have a large diameter (indicated at a reference 231). This large-diameter portion is referred to as "projection" hereinbelow. The projection 231 is formed like a disc integrally with the rotating shaft 51. The projection 231 may be preformed separately from the rotating shaft 51 and joined to the end of the rotating shaft 51 under pressure. In this case, each of the rotating shaft 51 and projection 231 is formed from a metal.

On the other hand, at the bottom of the housing 56 receiving the radial bearing 55 which supports the rotating shaft 51 circumferentially, there is provided a thrust bearing 232 which supports the projection 231 formed at the one end of the rotating shaft 51. The thrust bearing 232 is formed like a disc whose diameter is larger than that of the projection 231 in order to close an opening 61$a$ formed in the bottom of the housing 61. When installed to the housing 61, the thrust bearing 232 is made to abut a positioning step 233 formed on the bottom of the housing 61. Thus, the thrust bearing 232 is positioned in place for installation to the housing 61.

The thrust bearing 232 used in this bearing unit 230 is formed from a metal such as stainless steel.

A bottom portion 235 is provided at the side of the housing body 61 where the thrust bearing 232 is disposed. The bottom portion 235 is formed by molding a synthetic resin and joined by ultrasonic or thermal welding to the housing body 61 formed from a synthetic resin. It should be noted that the bottom portion 235 may be formed integrally with the housing body 61 by resin molding, such as the out-sert molding. Joining the bottom portion 235 to the housing body 61 provides a housing 56 sealed except for the shaft insertion hole 65. At this time, the disc-shaped thrust bearing 232 is made to abut the positioning step 233 and thus is supported on the bottom portion 235 for installation to the housing body 61.

Figure 47:
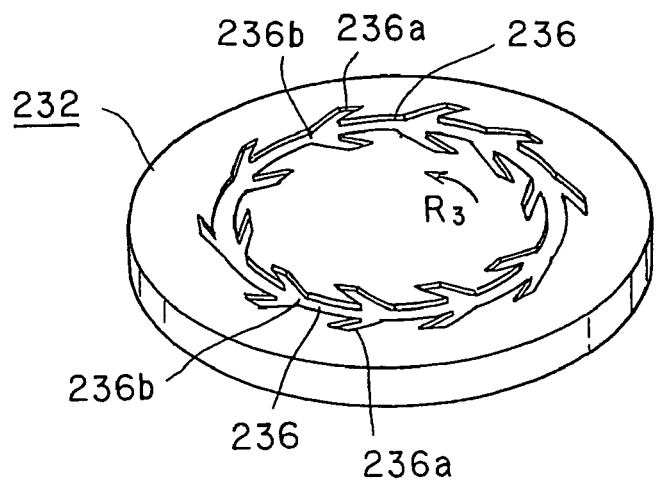
FIG. 47 is a perspective view of the thrust bearing used in the bearing unit shown in FIG. 46 and having dynamic pressure producing recesses formed therein.

On the side of the thrust bearing 232 that is opposite to the projection 231, there are formed dynamic pressure producing recess 236 as shown in FIG. 47. Namely, the thrust bearing 232 is a dynamic-pressure fluid bearing. At the side of the thrust bearing 232 opposite to the projection 231, there is provided the dynamic pressure producing recess 236 formed from a combination of pairs of recesses 236$a$, each pair forming a V shape, and a coupling recess 236$b$ coupling the pairs of V-shaped recesses 236$a$ with each other circumferentially of the thrust bearing 232. The dynamic pressure producing recess 236 is formed such that the V shape of each pair of recesses 236$a$ is directed at the bottom end thereof in a direction R3 in which the rotating shaft 51 rotates.

When the rotating shaft 51 rotates, the lubricant 57 filled in the housing 56 enters and circulates through the dynamic pressure producing recess 236 formed in the thrust bearing 232 formed as a dynamic-pressure fluid bearing to produce a dynamic pressure between the outer surface of the rotating shaft 51 and inner surface of the radial bearing 55. The projection 231 provided at the one end of the rotating shaft 51 thus will be supported on the thrust bearing 232. The dynamic pressure thus produced will minimize the friction between the rotating shaft 51 and thrust bearing 232 to assure smooth rotation of the rotating shaft 51. Especially in this embodiment, since the rotating shaft 51, supported by the radial bearing 55 and thrust bearing 232 formed each as a dynamic-pressure fluid bearing, rotates in the presence of the lubricant 57, sliding sound and vibration usually caused by sliding of the rotating shaft on the bearings can be minimized. Thus, the bearing unit 230 according to the present invention is extremely calm and stable.

Also, since the thrust bearing 232 is formed to have a larger diameter than that of the projection 231 provided at the one end of the rotating shaft 51, so the rotating shaft 51 can be supported very stably.

Figure 46:
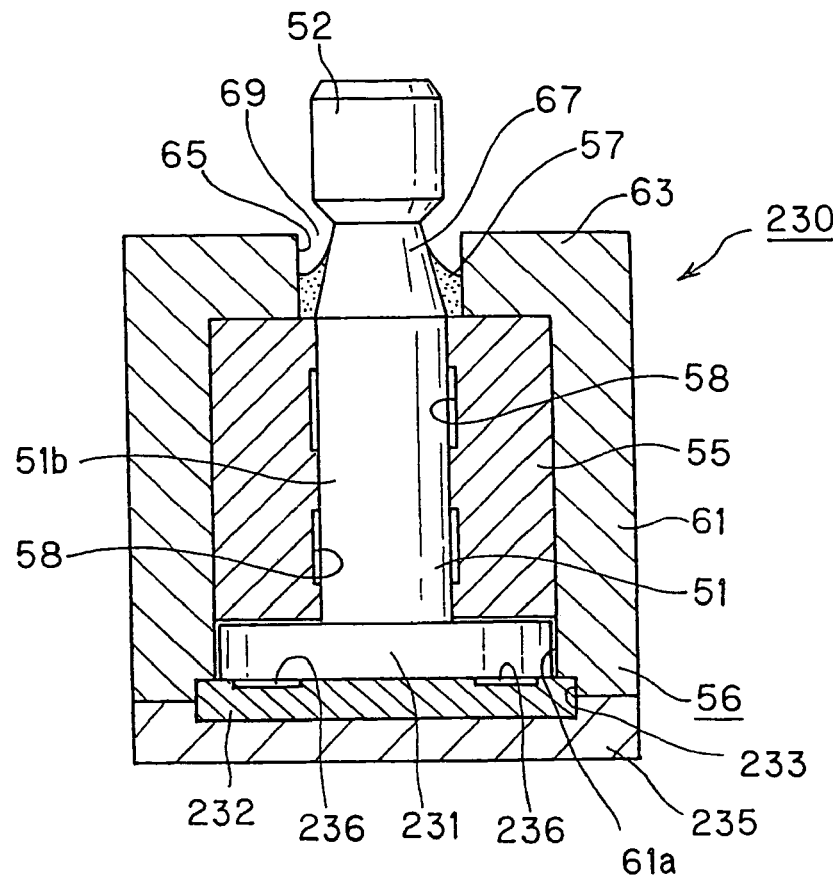
FIG. 46 is a sectional view of a sixth embodiment of the bearing unit according to the present invention, having a thrust bearing formed from a dynamic-pressure fluid bearing.

The bearing unit 230 shown in FIG. 46 is assembled by introducing the rotating shaft 51 with the projection 231 into the housing body 61 formed by the out-sert molding of the synthetic resin on the radial bearing 55, the thrust bearing 232 is disposed at the bottom of the housing body 61, and then the bottom portion 235 is welded to the housing body 61.

Further, the dynamic pressure producing recess may be formed in the end face of the radial bearing 55, opposite to the projection 231 of the rotating shaft 51. With the dynamic pressure producing recess thus provided, it is possible to minimize more positively the sliding sound usually caused by sliding of the rotating shaft on the bearings and thus provide the bearing unit 230 which is extremely calm and stable.

This bearing unit 230 can be applied very advantageously to the spindle motor of the disc drive unit shown in FIGS. 21 to 23. Since the bearing unit 230 is very calm, namely, since it is a lower-noise and less-vibration type, the disc drive unit using this bearing unit 230 can write or read information signals very stably.

Note that the bearing unit 230 shown in FIG. 46 also may be provided with the function of discharging the static electricity developed when the rotating shaft 51 rotates to outside.

Moreover, the bearing unit 230 shown in FIG. 46 may be provided with a fixing means, such as an engagement portion, for mechanical fixation of the housing 56 to a mating part of a motor, such as the spindle motor.

The aforementioned bearing units according to the present invention is constructed such that the lubricant filled in the housing is prevented from leaking out by controlling the gap between the outer surface of the rotating shaft and the inner surface of the shaft insertion hole formed in the housing and through which the rotating shaft is introduced. According to the present invention, however, the bearing unit may be constructed as will be described below to prevent the lubricant as a viscous fluid filled in the housing from leaking out.

Namely, the bearing unit that will be described below can surely prevent the lubricant from leaking to outside the housing even if the pressure in the housing having the lubricant filled therein changes due to an environmental change such as a barometric pressure change, a temperature change or the like.

Note that the bearing unit according to the present invention is adopted in the motor 12 of the radiator 10 shown in FIGS. 4 and 5, and so the same or similar elements as those of the radiator 10 will be indicated with the same or similar references as those used in the illustration and explanation of the radiator 10 and will not be described in detail any longer.

The bearing unit in consideration is provided with a vent path to prevent any change of the pressure in the housing, especially, to prevent the pressure in the housing from rising.

Figure 48:
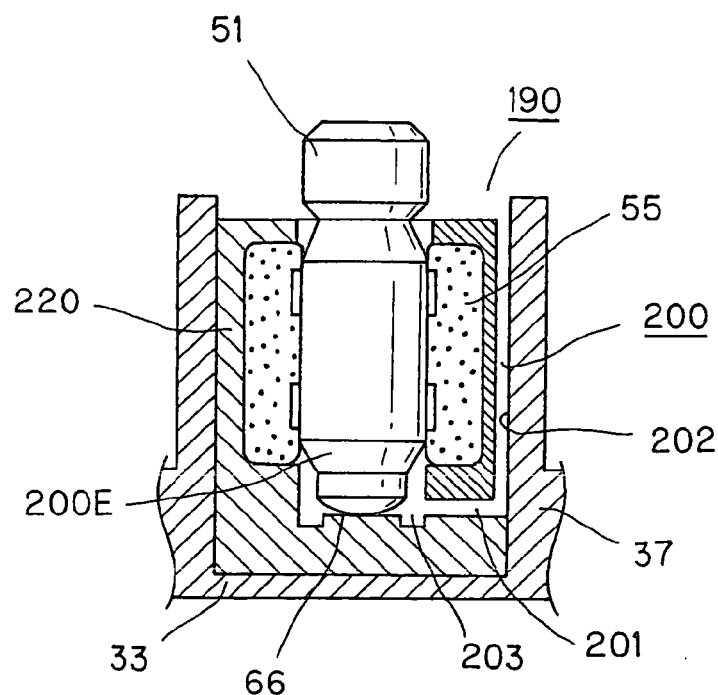
FIG. 48 is a sectional view of a seventh embodiment of the bearing unit according to the present invention, including radial and thrust bearings to support a shaft rotatably and a housing filled with a lubricant and having vent paths formed therein, and showing the bearing unit installed in a holder.
Figure 49:
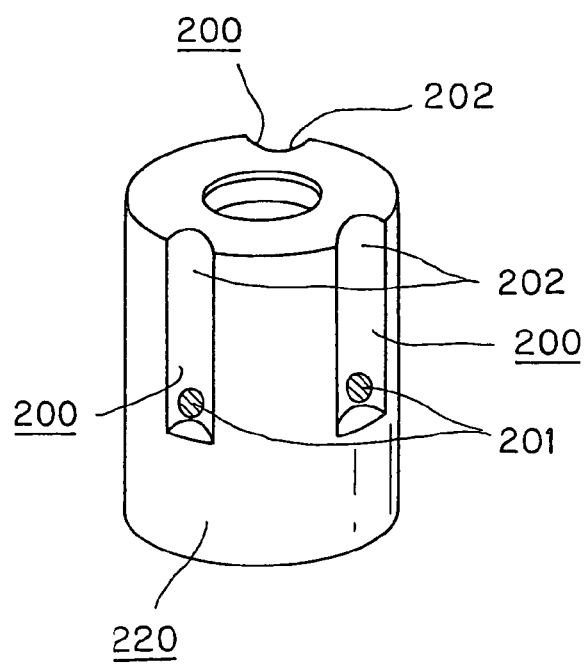
FIG. 49 is a perspective view of the bearing unit in FIG. 48, having vent paths formed therein.

The bearing unit is generally indicated with a reference 190 and provided with a vent path 200. As shown in FIGS. 48 and 49, showing the seventh embodiment of the bearing unit according to the present invention, the bearing unit 190 includes the radial bearing 55 and thrust bearing 66 to support the rotating shaft 51 to be rotatable, and has the vent path 200 formed in a housing 220 thereof having the lubricant 57 filled therein.

The vent path 200 is provided to prevent the lubricant 57 from leaking out of the bearing unit 190 due to expansion of air inside the housing 220 of the bearing unit 190 under a reduced pressure caused by an altitude change or the like. As shown in FIGS. 48 and 49, the vent path 200 is provided in one or more places in the housing 220, for example. In the embodiment shown in FIG. 49, the vent path is provided in three places at every predetermined angle on the outer surface of the housing 220. The vent paths 200 can easily be formed at the same time as the housing 220 is formed by out-sert molding integrally on the radial bearing 55 having already received the thrust bearing 66 therein. That is, since the vent paths 200 can easily be formed at the same time as the housing 220 and thrust bearing 66 are molded from a synthetic resin, even if they are to be formed in a complicated shape, so forming of the vent paths 200 will not add to the manufacturing cost of the bearing unit 190.

The vent paths 200 thus provided permit air from inside the radial bearing 55 to purge as the rotating shaft 51 is introduced into the radial bearing 55 for seating therein.

Each of the vent paths 200 shown in FIGS. 48 and 49 includes a first path 201 and second path 202. The first path 201 is formed radially of the housing 220 from an internal space 203 near the thrust bearing 66. The first path 201 is open at the inner end thereof to the space 203 where the thrust bearing 66 is formed to project from the bottom portion 62 of the housing 220. The first path 201 is open at the outer end thereof to the second path 202. The second path 202 is formed parallel to the axis of the housing 220 and open to the outer surface of the housing 220. Even the relatively complicated vent paths 200, because each consists of the first and second paths 201 and 202, can easily be formed at the same time as the housing 220 and thrust bearing 66 are formed by molding a synthetic resin.

Figure 50:
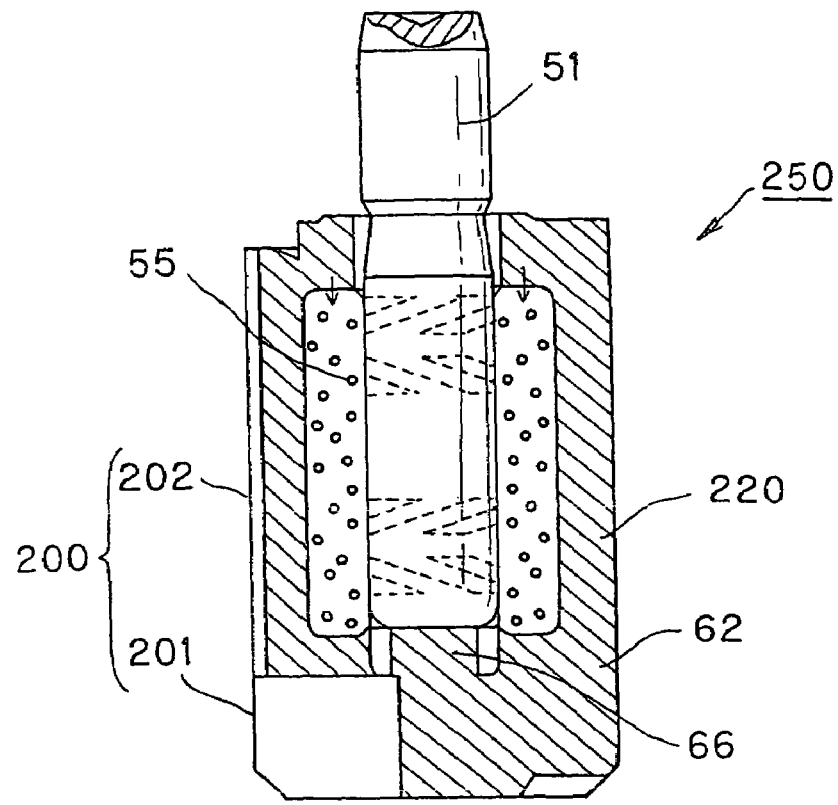
FIG. 50 is a sectional view of an eighth embodiment of the bearing unit according to the present invention, having vent paths formed therein.
Figure 51:
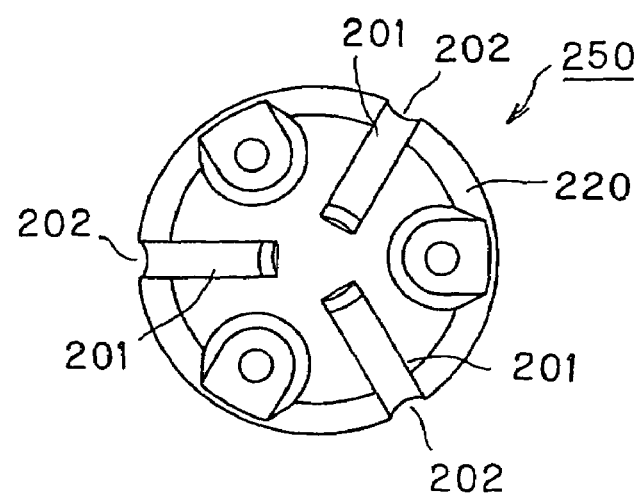
FIG. 51 is a bottom view of the bearing unit in FIG. 50.

FIGS. 50 and 51 show together the eighth embodiment of the bearing unit according to the present invention. This bearing unit is generally indicated with a reference 250. FIGS. 50 and 51 are a sectional view and a bottom view, respectively, of the bearing unit 250. The eighth embodiment is a variant of the bearing unit 230 shown in FIGS. 48 and 49, having formed therein the vent paths 200 different in shape from those in the bearing unit 230. The function of the vent paths is the same as in the bearing unit 230 in FIGS. 48 and 49.

Each of the vent paths 200 of the bearing unit 250 shown in FIGS. 50 and 51 consists of the first path 201 formed in the lower end portion of the housing 220, and the second path 202 formed in the outer surface of the housing 220 as in the bearing unit 190 shown in FIGS. 48 and 49. For example, for forming the housing 190 in FIGS. 48 and 49 by out-sert molding, at least two different-directional mold tools are required. However, the vent paths 200 can be formed in the bearing unit 250 shown in FIGS. 50 and 51 by a one-directional mold tool because the first path 201 is formed in the lower end portion of the housing 220. Thus, the mold tool can be simplified in structure.

More particularly, for making a horizontal hole, the mold tool has to be slid horizontally. Namely, the mold tool should of a sliding type. In the bearing unit 250 shown in FIGS. 50 and 51, however, since the first path 201 directed radially of the housing 220 is open at the bottom of the latter, the paths can be formed by a one-directional mold tool. Therefore, the bearing unit 250 can be produced by forming the housing 220 and sliding bearing 66 integrally with each other, and thus the manufacturing costs be reduced.

Note that the bottom end portion 51a of the rotating shaft 51, supported on the thrust bearing 66, is tapered (indicated at a reference 200E) toward the thrust bearing 66, which facilitates the insertion of the rotating shaft 51 into the radial bearing 55.

The bearing unit 190 shown in FIGS. 48 and 49 is to be used in the motor 12 of the radiator 10 as shown in FIG. 5. It is installed to the holder 37 of the stator yoke 33.

Figure 52:
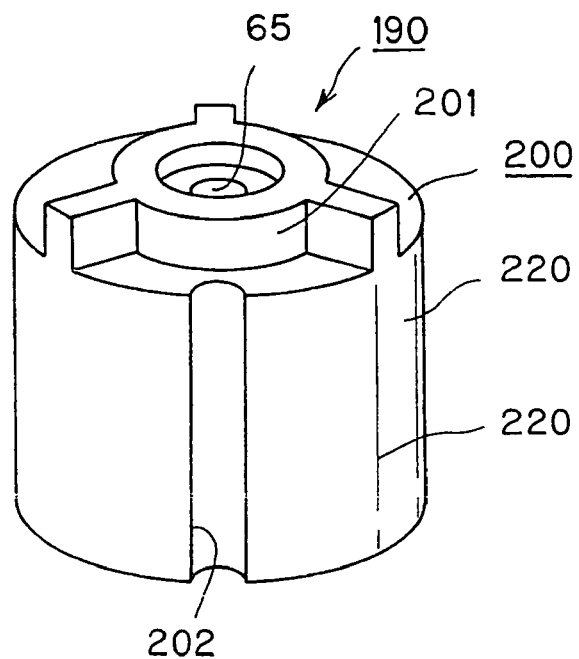
FIG. 52 is a perspective view of a variant of the seventh embodiment of the bearing unit in FIG. 48, having vent paths formed therein.
Figure 53:
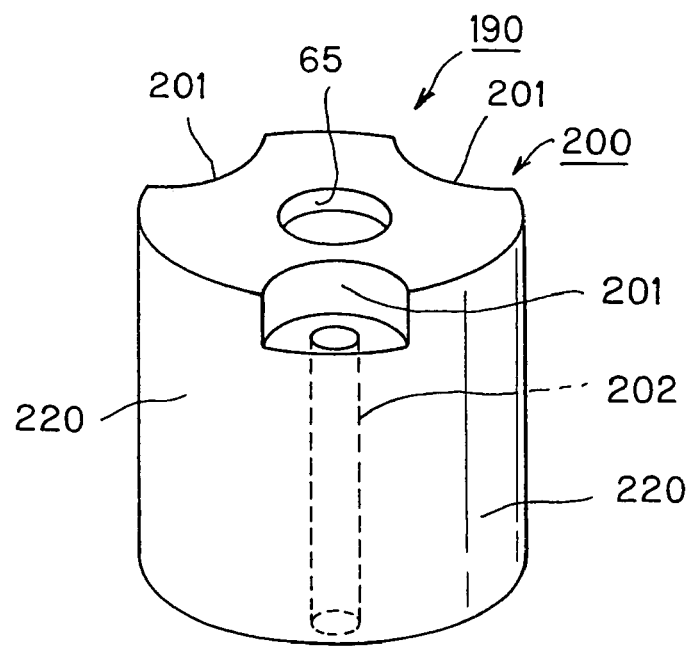
FIG. 53 is a perspective view of another variant of the seventh embodiment of the bearing unit in FIG. 48, having a vent path formed therein.

The bearing unit 190 having the vent paths 200 formed therein may be formed as shown in FIGS. 52 and 53.

The bearing unit 190 shown in FIG. 52 has the vent paths 200 including, for example, three sets of a first path 201 and second path 202. The first paths 201 are concavities formed in three equal circumferential sections on one end face of the housing 220. The second paths 202 are formed axially of the housing 220 and in parallel with each other. As shown, each of the first paths 201 connects to a corresponding one of the second paths 202.

The bearing unit 190 shown in FIG. 53 has the vent paths 200 including, for example, three sets of a first path 201 and second path 202. The first paths 201 are concavities formed in three places circumferentially equidistant from each other on one end face of the housing 220. The second paths 202 are through-holes formed in three places corresponding to the first paths in the housing 220, axially of the housing 220 and in parallel to each other. Each of the first paths 201 connects to a corresponding one of the second paths 202 and communicates with outside the housing 220.

Having the vent paths 200 formed in the housing 220, communicating with outside of the housing 220, the bearing unit can positively prevent the lubricant from leaking to outside the housing 220, even when the pressure inside the housing 220 having the lubricant filled therein is varied due to an environmental change such as a barometrical pressure change or temperature change.

Note that the vent paths 200, especially the first paths 201, should desirably be formed with such intervals between them that the surface tension of the lubricant 57 can be used to prevent the lubricant 57 from leaking when the bearing unit is in its normal condition.

The bearing unit uses a lubricant as a viscous fluid filled in the housing. However, the lubricant may be any one of various kinds of viscous fluid that have a specific viscosity and show a specific surface tension.

The bearing unit according to the present invention cannot only be used as a bearing of a motor of a radiator or of a spindle motor of a disc drive unit but also as a bearing of various types of motors.

Further, the bearing unit according to the present invention is usable in a motor as well as in a mechanism with a rotating shaft and a mechanism supporting a member that is rotatable in relation to a shaft.

INDUSTRIAL APPLICABILITY

As having been described in the foregoing, the bearing unit according to the present invention includes a housing in which bearings supporting a shaft are encased and also in which a viscous fluid is filled. The housing has such a sealed structure except for the shaft insertion hole formed therein for the shaft to be exposed to outside and so that the viscous fluid filled in the housing can be prevented from leaking to outside the housing. So, this housing structure to positively protects various devices using the bearing unit, such as an information recorder/player.

Since the housing of the bearing unit, sealed except for the shaft insertion hole, can be formed as a one-piece structure by molding a synthetic resin, the bearing unit can be produced easily and inexpensively.

Provided with a means for fixing the housing to a mating object, the bearing unit according to the present invention can be positioned for fixation to the mating object and thus provides a high-precision bearing mechanism.

Further, the bearing unit according to the present invention can eliminate the influence of static electricity developed when the shaft or housing rotates. Therefore, the various devices using this bearing unit, such as an information recorder/player, can be protected positively against such static electricity.

The invention claimed is:

1. A bearing unit comprising:
   a shaft;
   a radial bearing to support the shaft circumferentially;
   a thrust bearing to support the shaft at one of the thrusting-directional ends thereof; and
   a housing in which the radial and thrust bearings supporting the shaft are disposed and a viscous fluid is filled;
   the housing having a hermetic structure except for a shaft insertion hole receiving the shaft therein and in which there is defined between the outer surface of the shaft and the inner surface of the shaft insertion hole a gap having a sufficient width to prevent the viscous fluid filled in the housing from leaking to outside,
   wherein the end portion of the housing where the thrust bearing is disposed formed from a synthetic resin same as the housing is joined by welding to the housing body also formed from the synthetic resin and in which the radial bearing is disposed.

2. The bearing unit as set forth in claim 1, wherein the welding is ultrasonic welding.

3. The bearing unit as set forth in claim 1, wherein the thrust bearing is formed integrally at the end portion of the housing.

4. The bearing unit as set forth in claim 1, wherein the thrust bearing is formed from a metal.

* * * * *